(12) United States Patent
Nakamura

(10) Patent No.: US 7,052,144 B2
(45) Date of Patent: May 30, 2006

(54) PROJECTOR

(75) Inventor: Kunihisa Nakamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 10/923,707

(22) Filed: Aug. 24, 2004

(65) Prior Publication Data

US 2005/0094106 A1   May 5, 2005

(30) Foreign Application Priority Data

Aug. 26, 2003  (JP)  ............................. 2003-301357

(51) Int. Cl.
*G03B 21/16*  (2006.01)
(52) U.S. Cl. .................................................. 353/61
(58) Field of Classification Search ............... 353/57, 353/58, 60, 61
See application file for complete search history.

(56) References Cited

U.S. PATENT DOCUMENTS

| 6,558,004 B1* | 5/2003 | Ito et al. ...................... 353/57 |
| 6,793,343 B1* | 9/2004 | Nakano et al. ................ 353/61 |
| 6,840,628 B1* | 1/2005 | Arai et al. .................... 353/58 |
| 6,957,892 B1* | 10/2005 | Kuroda ......................... 353/61 |
| 6,966,654 B1* | 11/2005 | Ozawa et al. ................. 353/61 |
| 2004/0189954 A1* | 9/2004 | Kuroda ......................... 353/61 |
| 2005/0117122 A9* | 6/2005 | Ito et al. ........................ 353/57 |

FOREIGN PATENT DOCUMENTS

| JP | U-5-59424 | 8/1993 |
| JP | A-8-304739 | 11/1996 |
| JP | A-10-186546 | 7/1998 |
| JP | A-11-354963 | 12/1999 |

* cited by examiner

*Primary Examiner*—William C. Dowling
(74) *Attorney, Agent, or Firm*—Oliff & Berridge, PLC

(57) ABSTRACT

A projector includes a sirocco fan 762 as an exhaust fan arranged oppositely to an exhaust hole 2B formed on an exterior case 2 to suck air inside the exterior case 2 and to discharge the air to the outside via the exhaust hole 2B. The sirocco fan 762 is arranged such that a suction side thereof is along a plane orthogonal to an optical path plane defined by a light source device, an optical modulator and a projection optical device of a device body of the projector. Further, the sirocco fan 762 is arranged such that a discharge hole 762A is inclined in a fan rotation direction to discharge the sucked air substantially to the center of an end surface with the exhaust hole 2B formed in a thickness direction.

Accordingly, such projector is provided that can enhance an exhaust efficiency by sucking the air of the inside effectively without the rotation number of the exhaust fan increased, and also can reduce the thickness thereof.

10 Claims, 15 Drawing Sheets

PROJECTOR

TECHNICAL FIELD

The present invention relates to a projector.

BACKGROUND ART

Conventionally, a projector that modulates a light beam irradiated by a light source in accordance with image information to form an optical image by a modulator and projects the optical image in an enlarged manner has been known.

In such a projector, since luminance of the light source is increased, an exhaust structure for exhausting air heated by the light source with its temperature increasing has been employed (for example, see JP Hei11-354963A).

According to this exhaust structure, a sirocco fan is applied as a centrifugal fan that exhausts the air inside the projector to the outside.

More specifically, the sirocco fan is arranged such that a suction side thereof is along an optical path plane defined by a light source device, an optical modulator and a projection optical device.

The sirocco fan sucks the air heated by the optical modulator, the light source device and the like located above a suction hole thereof, and discharges the air in a projection direction of a light beam from the projection optical device via an exhaust hole of the projector, i.e., in a direction from the front side of the projector to the outside.

DISCLOSER OF THE INVENTION

According to the exhaust structure disclosed in Patent Document 1, however, since the sirocco fan is located below the optical modulator, the light source device and the like, rotation number of the sirocco fan must be increased in order to suck downwardly the air heated by the optical modulator, the light source device and the like, i.e., the arising air due to its low air density. Thus, it is difficult to suck the air inside the projector effectively, noise of the sirocco fan itself is increased, and consequently quietness of the projector cannot be ensured.

Herein, in order to avoid the above disadvantages, such a configuration is conceivable that the discharge hole of the sirocco fan is arranged oppositely to the exhaust hole of the projector, while the suction side of the sirocco fan is arranged along a plane orthogonal to the optical path plane defined by the light source device, the optical modulator and the projection optical device.

In the meanwhile, in order to effectively exhaust the air discharged from the discharge hole to the outside of the projector, the substantial center of the discharge hole must be corresponded to the substantial center of the exhaust hole, and a profile of the exhaust hole must be enlarged in both vertical and horizontal directions about the substantial center thereof in compared to a profile of the discharge hole.

However, since the discharge hole of the sirocco fan is arranged along a top surface or a bottom surface of the projector in the above-described configuration, the thickness of the projector needs to be increased in order to form the exhaust hole for a projector at a position corresponding to that of the discharge hole.

An object of the present invention is to provide a projector that can enhance an exhaust efficiency by sucking air of the inside effectively without increasing the rotation number of an exhaust fan, and also can reduce the thickness thereof.

A projector according to an aspect of the present invention includes: a light source device; an optical modulator that modulates a light beam irradiated by the light source device in accordance with image information; a projection optical device that projects the modulated light beam in an enlarged manner; and a substantially rectangular parallelepiped casing in which the light source device, the optical modulator, and the projection optical device are arranged, in which an exhaust hole that exhausts air inside the casing to the outside is formed on the casing on one of end surfaces substantially orthogonal to a projection direction of the light beam from the projection optical device, an exhaust fan that sucks the air inside the casing and discharges the air via the exhaust hole is provided on the casing, the exhaust fan being opposed to the exhaust hole, and the exhaust fan is a centrifugal fan that discharges the air sucked from a fan rotation axis direction to a rotation tangential direction, a suction side of the exhaust fan being disposed along a plane orthogonal to an optical path plane defined by the light source device, the optical modulator and the projection optical device, a discharge side thereof being inclined in a fan rotation direction, so that the sucked air is discharged substantially toward the center of the end surface with the exhaust hole formed in a direction orthogonal to the optical path plane.

In the present invention, the centrifugal fan as the exhaust fan is arranged such that the suction side thereof is along a plane orthogonal to the optical path plane defined by the light source device, the optical modulator and the projection optical device, and the discharge side thereof is inclined in the fan rotation direction. The centrifugal fan then discharges the sucked air substantially to the center of the end surface, on which the exhaust hole is formed, in the direction orthogonal to the optical path plane defined by the light source device, the optical modulator and the projection optical device. Accordingly, the exhaust efficiency can be enhanced by effectively sucking the air inside the projector without increasing the rotation number of the centrifugal fan more than necessary, and besides the thickness of the projector is not required to be increased even when the exhaust hole is formed on the end surface of the casing at the position corresponding to the position of the discharge hole.

Preferably, according to the above projector of the present invention, the exhaust hole may be formed on an end surface of the casing positioned in the projection direction, and the exhaust fan may be disposed such that the suction side is inclined relative to the projection direction, so that the air inside the casing is discharged to the outside in a direction away from the projection direction through the exhaust hole.

According to the present invention, since the exhaust hole is formed on the end surface of the casing located in the projection direction, the heated air exhausted from the projector will be exhaust from the projection side. In other words, the heated air can be inhibited from blowing to a person who is located on the rear side or the lateral side of the projector.

Further, since the exhaust fan discharges the air of the inside in the direction away from the projection direction via the exhaust hole, the exhaust direction can be set in a direction aside the projection image projected by the projector, thus preventing flickers or the like of the projection image due to the heated air.

Preferably, the above projector of the present invention may further include: a louver for rectifying the air discharged from the exhaust fan in a predetermined direction and a fan fixture that fixes the exhaust fan and the louver inside the casing in an integrated manner, in which the louver has a fixture that is fixed to the fan fixture, the louver being supported in a cantilevered manner relative to the fan fixture by the fixture.

For instance, when the exhaust fan is fixed to the casing with the fan fixture being interposed while the louver is engaged with the exhaust hole of the casing, the position of the louver is likely to be deviated relative to the discharge hole of the exhaust fan, and a clearance may be formed between the discharge hole and the louver. Accordingly, a part of the air discharged from the exhaust fan will not be exhausted to the outside via the exhaust hole, but returns to the inside of the projector, and consequently a cooling efficiency of the projector at the inside will be deteriorated.

In the present invention, since the exhaust fan and the louver are fixed inside the casing while being integrated by the fan fixture, when the exhaust fan and the louver are attached to the casing, the louver will not be deviated from its proper position relative to the discharge hole of the exhaust fan, and besides the clearance formed between the discharge hole and the louver can be reduced. Therefore, the cooling efficiency at the inside of the projector on account of the exhausted air heading back to the inside of the projector will not be deteriorated.

Further, since the louver is supported in a cantilevered manner relative to the fan fixture, the louver can move relative to the fan fixture even when the louver is attached to the casing while the exhaust fan and the louver are fixed by the fan fixture, so that the louver can appropriately be engaged with the exhaust hole of the casing, and the exhaust fan and the louver can easily be placed in the casing.

Preferably, according to the above projector of the present invention, the louver may surround a discharge hole of the exhaust fan, and may include a tube component inserted and fitted to the discharge hole.

In the present invention, since the louver has the tube component, no clearance will be formed between the louver and the exhaust fan, thereby exhausting all of the air discharged from the exhaust fan to the outside via the louver.

Preferably, the above projector of the present invention may further include: a shield member disposed along an inner circumference of the casing, in which the fan fixture is a metal member arranged to cover the exhaust fan and is electrically connected to the shield member.

In the present invention, since the fan fixture is a metal member arranged to cover the exhaust fan, the electromagnetic wave radiated from the exhaust fan as the exhaust fan drives can be shielded, thereby avoiding the electromagnetic interference against external equipments.

Additionally, since the projector is provided with the shield member along the inner circumference of the casing, the shield member can shield the electromagnetic wave radiated from the respective components of the projector, thereby further avoiding the electromagnetic interference against the external equipments.

Still additionally, since the fan fixture is electrically connected to the shield member, the electric potential of the fan fixture and the shield member can be identical with each other, thereby restricting the mutual interference due to variation in the electric potential among the exhaust fan and other components.

Preferably, according to the above projector of the present invention, the exhaust fan may be attached around the light source device inside the casing with the fan fixture being interposed, the casing may have a lamp cover that detachably attaches the light source device to the casing, and a lamp cover fixture for fixing the lamp cover to the casing may be formed on the fan fixture.

Incidentally, when the lamp cover is fixed to the casing, it is conceivable that the fixing structure is applied between the casing and the lamp cover, however, the fixing structure may be exposed at the external surface of the projector according to such structure. It is undesirable in view of the appearance of the projector.

Further, in order to maintain the appearance of the projector, it is conceivable to provide a fixing member for fixing the lamp cover to the casing, however, such structure may not save the space inside the projector.

In the present invention, since the lamp cover fixture for fixing the lamp cover to the casing is formed on the fan fixture, the fixing structure of the lamp cover to the casing will not be exposed at the external surface of the projector by fixing the lamp cover to the lamp cover fixture, thus appropriately maintaining the appearance of the projector. Further, since it is not required to provide the fixing member additionally at the inside of the casing in order to fix the lamp cover, the space inside the projector can be saved and production cost of the projector can be lowered in view of reduction in the number of components.

BEST MODE FOR CARRYING OUT THE INVENTION

An embodiment of the present invention will be described below with reference to the attached drawings.

(1) External Configuration

Figure 1:
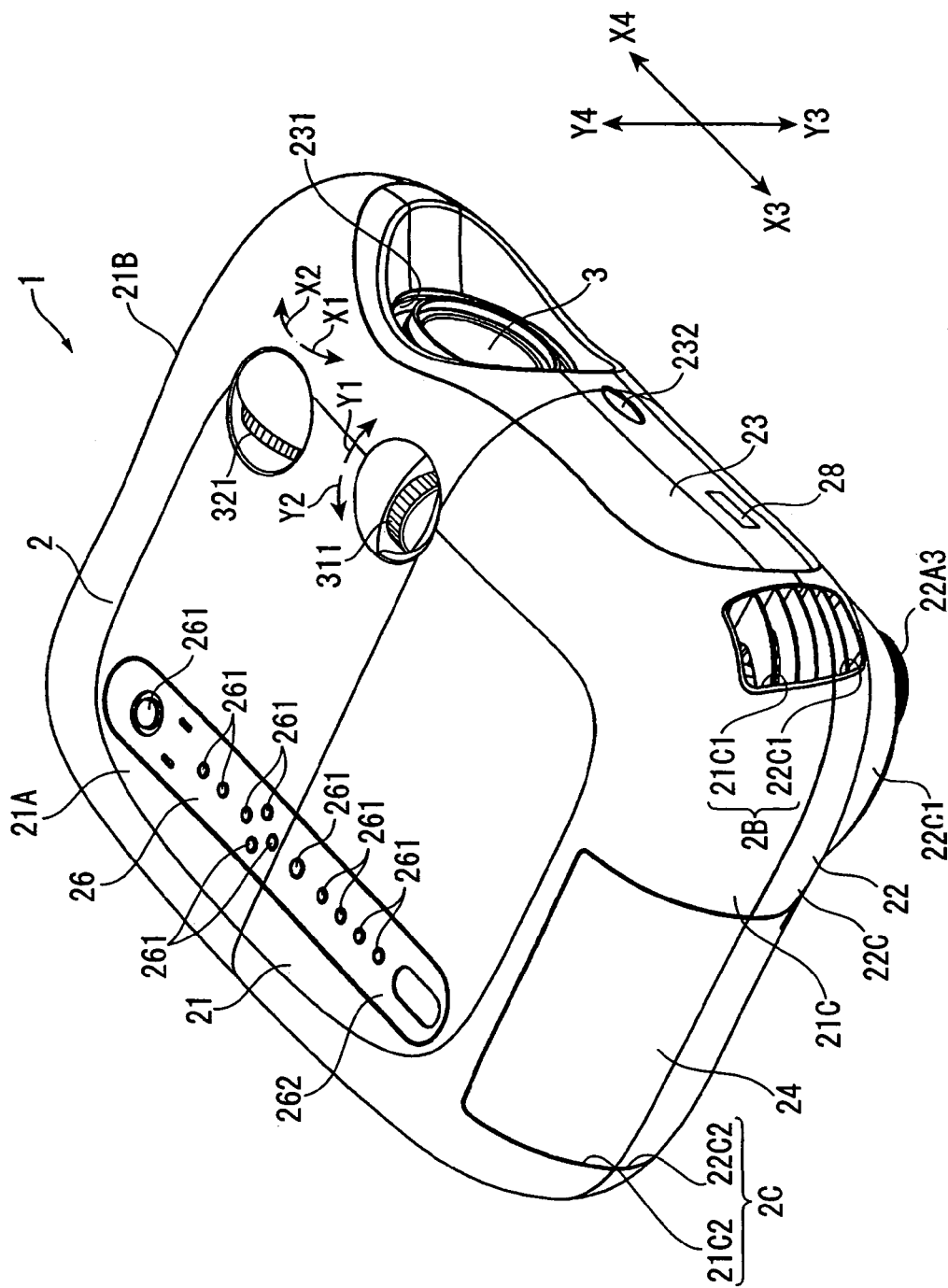
FIG. 1 is a perspective view showing an upper front side of the projector according to an embodiment of the present invention.
Figure 2:
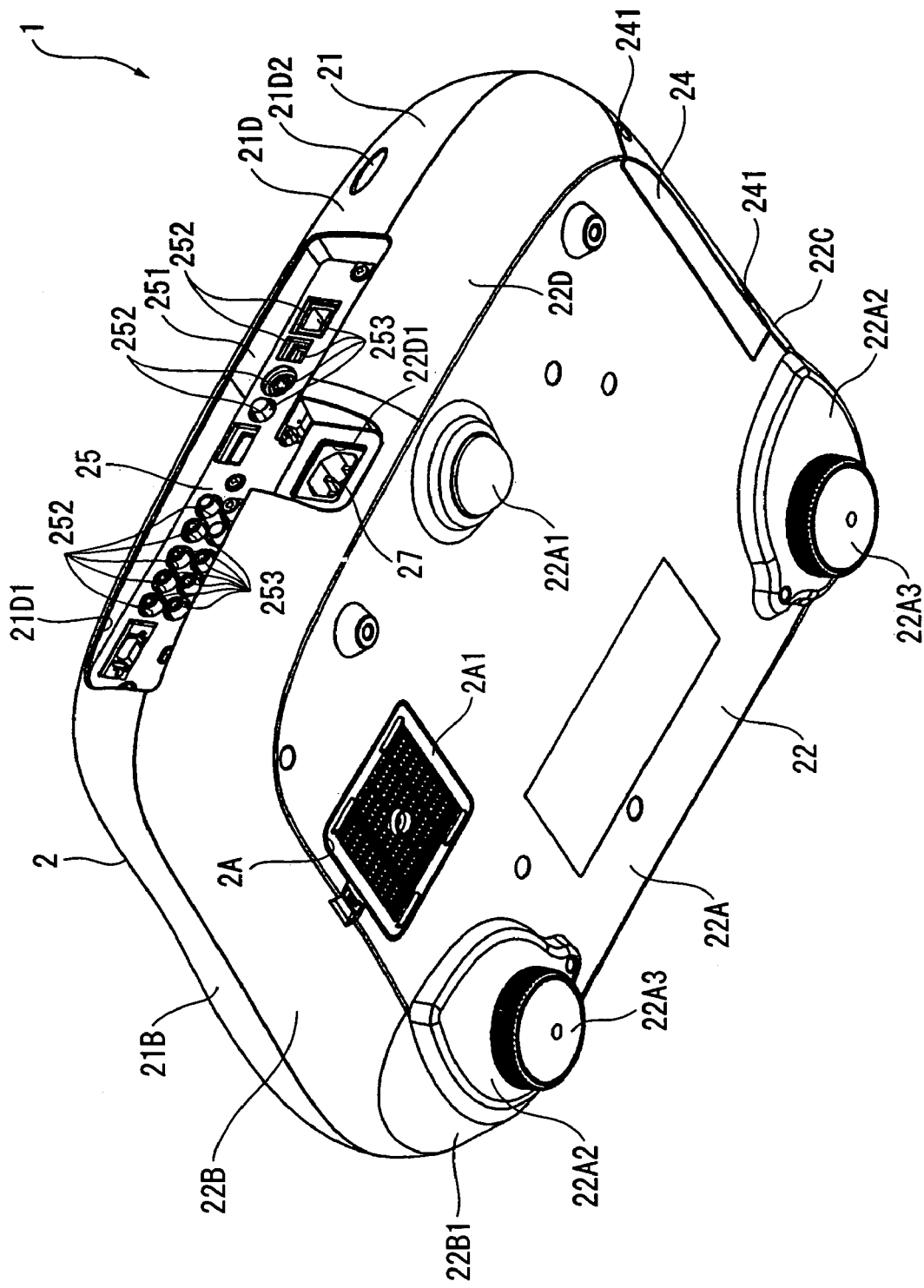
FIG. 2 is a perspective view showing a lower rear side of the projector of the aforesaid embodiment.

FIG. 1 is a perspective view showing an upper front side of a projector 1 according to the present embodiment. FIG. 2 is a perspective view showing a lower rear side of the projector 1.

The projector 1 modulates a light beam irradiated by a light source in accordance with image information and projects the light beam on a projection surface such as a screen in an enlarged manner. As shown in FIG. 1 or 2, the projector 1 has an exterior case 2 as an approximately rectangular parallelepiped casing and a projection lens 3 as a projection optical device exposed from the exterior case 2.

The projection lens 3 is configured as a lens set including a plurality of lenses housed in a cylindrical lens barrel, and projects in an enlarged manner an optical image modulated by a device body of the projector 1 in accordance with image information.

The exterior case 2 is a synthetic resin casing, which houses the device body of the projector 1. As shown in FIG. 1 or 2, the exterior case 2 has an upper case 21 covering an upper portion of the device body, a lower case 22 covering a lower portion of the device body, a front case 23 (FIG. 1) covering a front portion of the device body, a side case 24 covering a part of a lateral portion of the device body and a rear case 25 (FIG. 2) covering a part of a rear portion of the device body.

As shown in FIG. 1 or 2, the upper case 21 includes an upper side 21A (FIG. 1), lateral sides 21B and 21C (FIG. 1) and a rear side 21D (FIG. 2) respectively forming an upper side, parts of lateral sides and a part of a rear side of the exterior case 2.

As shown in FIG. 1, the upper side 21A is substantially rectangular in plane view, with the shape thereof gently curved toward the front side, the lateral sides and the rear side from the substantial center in plane view to form a curved convex profile, thus defining the upper side of the exterior case 2. Additionally, a front edge of the upper side 21A is formed such that a right portion in front view is cut in a curved manner as shown in FIG. 1.

As shown in FIG. 1, an operation panel 26 for actuating and adjusting the projector 1 horizontally extends substantially at the rear center of the upper side 21A. Pushing an operation button 261 of the operation panel 26 causes contact with a tactile switch mounted on a circuit board (not shown) disposed inside the operation panel 26 to allow a desired operation.

Additionally, an LED (Light Emitting Diode), which is not shown, is mounted on the circuit board so that the LED emits a light in response to the desired operation. A decorative panel 262 is provided on the operation panel 26 as the operation button 261 is surrounded by the decorative panel 262. The light emitted by the LED is diffused via the decorative panel 262.

The circuit board of the above-described operation panel 26 is electrically connected with a below-described control board, and an operation signal accompanied by the push-down operation of the operation button 261 is output to the control board.

As shown in FIG. 1, two dials 311 and 321 of a projection lens position adjuster 30 (see FIG. 7) for vertically and horizontally moving the projection lens 3 to adjust the position of the projection lens 3 are exposed from the front right portion of the upper side 21A in front view. In the two dials 311 and 321, when the dial 311 is rotated in a Y1 direction (forward), the projection lens 3 moves in a Y3 direction (downward), and when the dial 311 is rotated in a Y2 direction (rearward), the projection lens 3 is moved in a Y4 direction (upward). On the other hand, when the dial 321 is rotated in an X1 direction (rightward while viewing the projector 1 from the rear side), the projection lens 3 is moved in an X3 direction (rightward), and when the dial 321 is rotated in an X2 direction (leftward while viewing the projector 1 from the rear side), the projection lens 3 is moved in an X4 direction (leftward).

As shown in FIG. 1 or 2, the lateral sides 21B and 21C substantially vertically extend from both longitudinal edges of the upper side 21A, and both edges in the projection direction curve to form a curved convex surface respectively towards the front side and the rear side.

The lateral side 21C, as shown in FIG. 1, is provided with a cutout 21C1 having a C-shape in plane view at the front side thereof, and a cutout 21C2 having a C-shape in plane view extending from the substantial center in the projection direction toward the rear side.

As shown in FIG. 2, the rear side 21D substantially extend from a rear short edge of the upper side 21A, and the both longitudinal edge curve to connect to the lateral sides 21B and 21C.

As shown in FIG. 2, the rear side 21D is provided with a cutout 21D1 having a C-shape in plane view extending from the left side in rear view toward the substantial center in the longitudinal direction.

A remote controller sensor window 21D2 is formed on the right side of the rear side 21D in rear view as shown in FIG. 2. A remote controller module (not shown) for receiving an operation signal from a remote controller (not shown) is disposed inside the remote controller sensor window 21D2.

An activation switch and an adjustment switch etc. similar to those provided on the operation panel 26 are provided on the remote controller. When the remote controller is operated, an infrared signal corresponding to the operation is output from the remote controller to be received by the remote controller module via the remote controller sensor window 21D2, so that the infrared signal is processed by the below-described control board.

As shown in FIG. 2, the lower case 22 includes a bottom side 22A, lateral sides 22B and 22C, and a rear side 22D respectively forming a bottom side, parts of the lateral sides and a part of the rear side of the exterior case 2.

The bottom side 22A, as shown in FIG. 2, has a substantially rectangular flat surface defining a bottom side of the exterior case 2.

As shown in FIG. 2, a fixed leg 22A1 constituting a leg portion of the projector 1 is provided on the bottom side 22A at the substantial rear center in the longitudinal direction. Additionally, bulged portions 22A2 bulging downward are provided on the bottom side 22A at front both ends in the longitudinal direction. Each of the bulged portions 22A2 has an adjustment leg 22A3 constituting the leg portion of the projector 1 together with the fixed leg 22A1.

The adjustment leg 22A3 can project or retroject from the bulged portion 22A2 in an out-plane direction of the bottom side 22A, so that inclination of the projector 1 in vertical and horizontal directions can be adjusted as the projector 1 projects image.

Further, as shown in FIG. 2, a suction hole 2A, which communicates with the inside of the exterior case 2, is provided on the bottom side 22A at the substantial center in a short side direction on the left side in rear view.

The suction hole 2A is an opening for sucking cooling air from the outside of the exterior case 2. A cover 2A1 with a plurality of openings formed is attached to the suction hole 2A.

As shown in FIG. 1 or 2, the lateral sides 22B and 22C vertically arranged on both longitudinal edges of the bottom side 22A, and both edges of the lateral sides 22B and 22C in the projection direction are curved to form a curved convex surface respectively towards the front side and the rear side.

As shown in FIG. 1 or 2, bulged portions 22B1 (FIG. 2) and 22C1 (FIG. 1), which bulge outward substantially continuously from the bulged portions 22A2 of the bottom side 22A, are formed on the front lower ends of the lateral sides 22B and 22C.

Additionally, formed on the lateral side 22C are, as shown in FIG. 1, a cutout 22C1 having a C-shape in plane view at the front side thereof, and a cutout 22C2 having a C-shape in plane view extending substantially from the center in the projection direction toward the rear side. An exhaust hole 2B for exhausting the air inside the exterior case 2 to the outside thereof is formed by connecting the cutout 21C1 of the upper case 21 with the cutout 22C1 of the lower case 22. Further, an opening 2C, which engages with the side case 24, is formed by connecting the cutout 21C2 of the upper case 21 with the cutout 22C2 of the lower case 22.

As shown in FIG. 2, the rear side 22D is vertically arranged on the longitudinal rear edge of the bottom side 22A, and the both longitudinal edge of the rear side 22D curve to connect to the lateral sides 22B and 22C in the substantially same manner as the rear side 21D of the upper case 21.

As shown in FIG. 2, a rectangular opening 22D1 dented toward the inside of the exterior case 2 is formed on the bottom surface of the rear side 22D at the substantial center of an upper longitudinal edge thereof. Besides, an inlet connector 27, which is inner component, is exposed via the opening 22D1, so that the electric power can be supplied to the device body of the projector 1 from the outside.

As shown in FIG. 1, the front case 23 is formed in a substantially ellipsoidal shape extending in a horizontal direction with a right portion thereof in front view being bulged in a vertical direction. The front case 23 engages with an opening, which is formed on the front side when the upper case 21 and the lower case 22 are connected to form the front side of the exterior case 2.

As shown in FIG. 1, a substantially circular opening 231 dented towards the inside of the exterior case 2 is formed at the center of the dent on a right portion of the front case 23 in front view. The opening 231 causes an end of the projection lens 3 to be exposed.

As shown in FIG. 1, a remote controller sensor window 232, which is like the above-described remote controller sensor window 21D2, is provided substantially at the center of the front case 23 in the longitudinal direction. The projector 1 can remotely be controlled by using a remote controller (not shown) from both front and rear sides of the projector 1 through these remote controller sensor windows 21D2 and 232.

Further, as shown in FIG. 1, a rating plate 28 indicating a name of manufacturer, a name of product or the like of the projector 1 is provided at a left portion of the front case 23 in front view.

As shown in FIG. 1, the side case 24 configured by a plate having a substantially circular cross-section engages with the opening 2C of the exterior case 2 to form the lateral side of the exterior case 2 together with the lateral sides 21B and 21C of the upper case 21 and the lateral sides 22B and 22C of the lower case 22.

A below-described light source device constituting the device body of the projector 1 is arranged inside the side case 24 in a manner that the light source device can be detached from the device body by removing the side case 24 from the exterior case 2. That is, the side case 24 corresponds to a lamp cover of the present invention.

As shown in FIG. 2, a fixing hole 241 is formed on a lower end of the side case 24, the fixing hole 241 being fixed to a fixing member located inside the exterior case 2 by a screw or the like.

The rear case 25 configured by a substantially rectangular plate has a projection 251 projecting rearward from each of edges of the plate to have a substantially C-shaped cross-section. In the rear case 25, an end of the projection 251, the cutout 21D1 formed on the rear side 21D of the upper case 21 and an upper end of the rear side 22D of the lower case 22 are connected with each other, to close the opening formed on the rear side while the upper case 21 and the lower case 22 are connected together. The rear case 25 then forms the rear side of the exterior case 2 together with the rear side 21D of the upper case 21 and the rear side 22D of the lower case 22.

As shown in FIG. 2, a plurality of holes 252 are formed on the rear case 25. A plurality of connector terminals 253 are exposed through the plurality of holes 252 so that an image signal, an audio signal and the like are input from external electric equipments. An interface board (not shown) for processing the signals input by the connector terminals 253 is disposed inside the rear case 25.

Incidentally, the interface board is electrically connected with the below-described control board and the signal processed by the interface board is output to the control board.

(2) Internal Configuration

Figure 3:
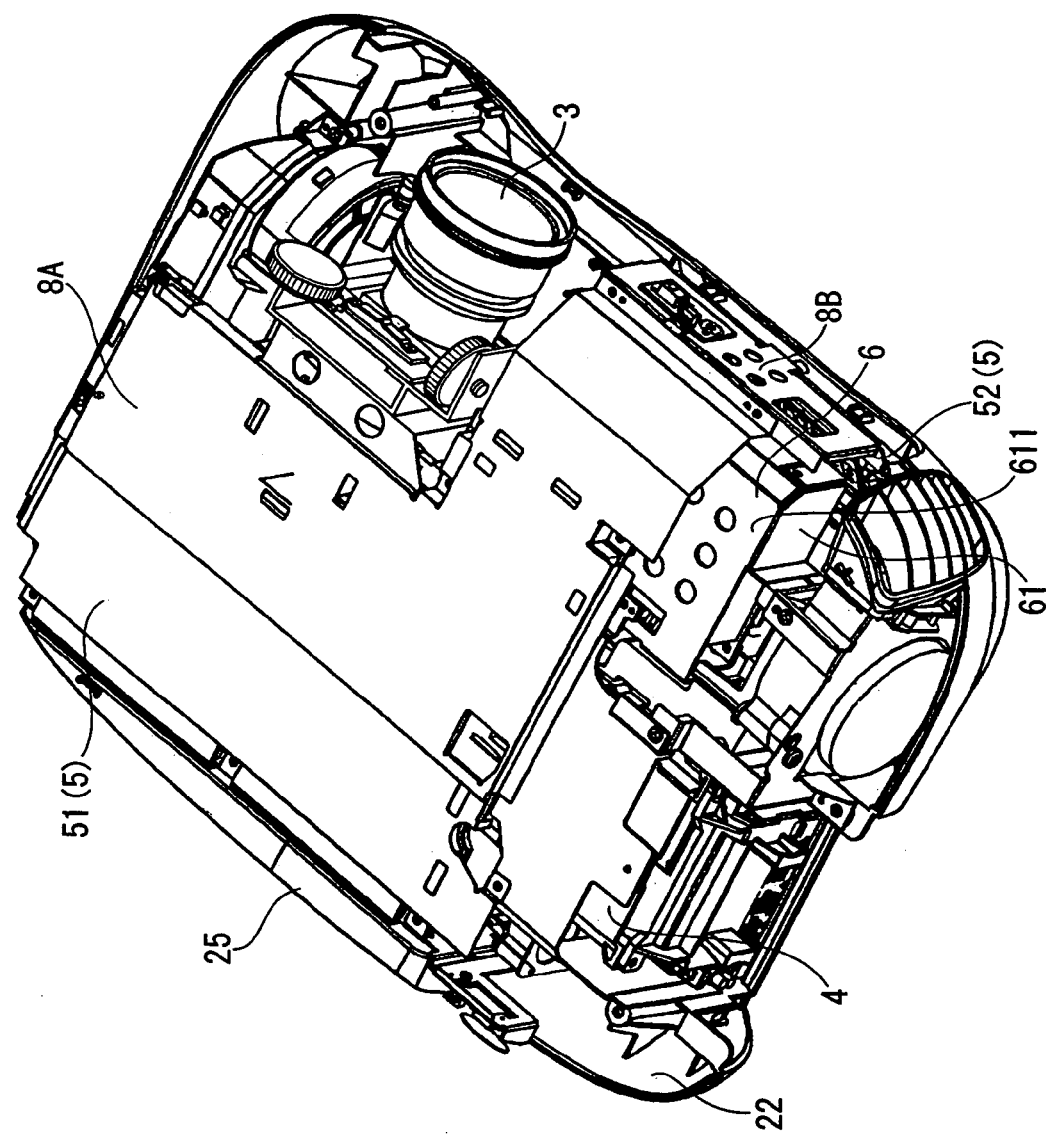
FIG. 3 is an illustration showing an inner configuration of the projector of the aforesaid embodiment.
Figure 4:
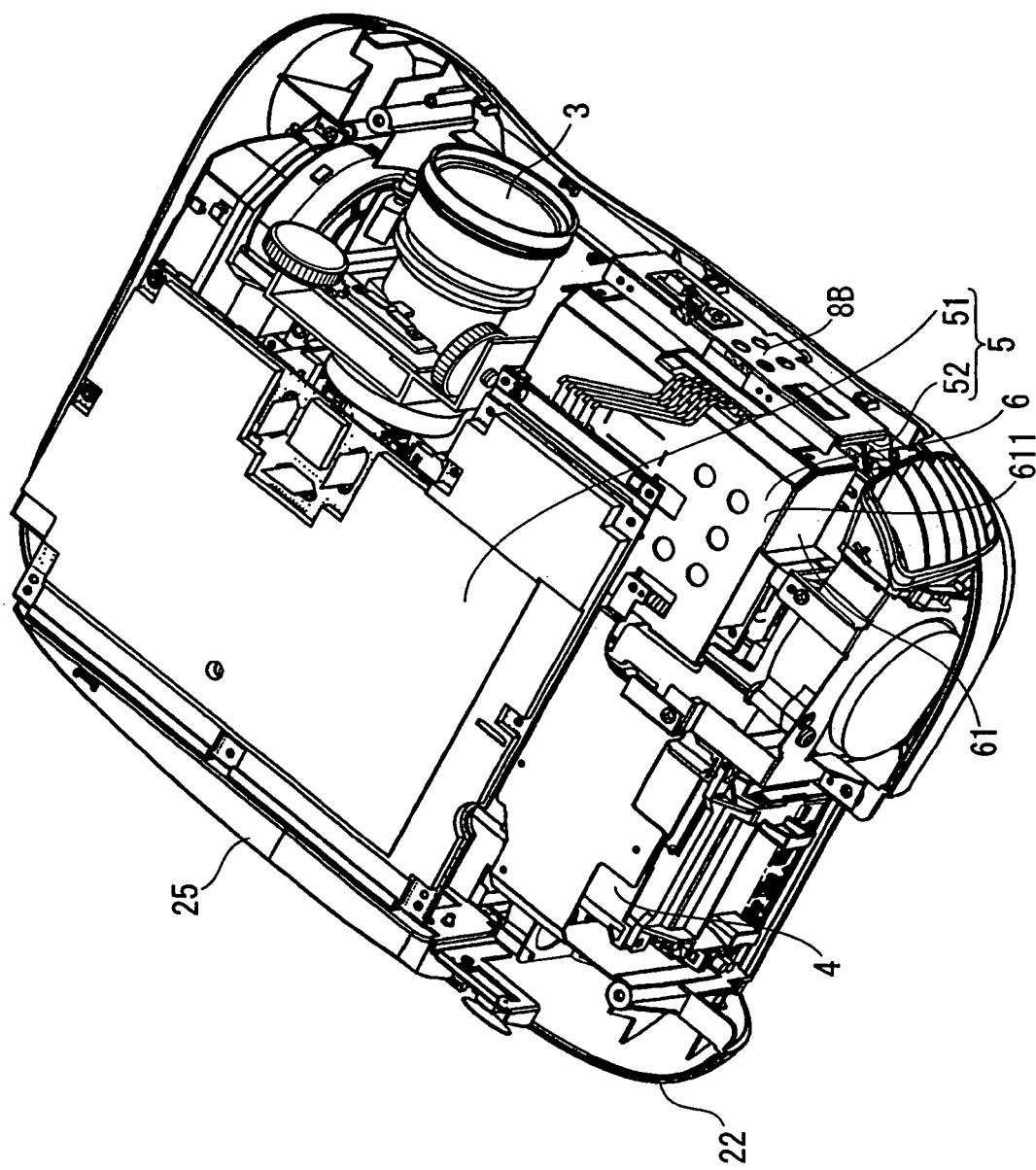
FIG. 4 is an illustration showing an internal configuration of the projector of the aforesaid embodiment.
Figure 5:
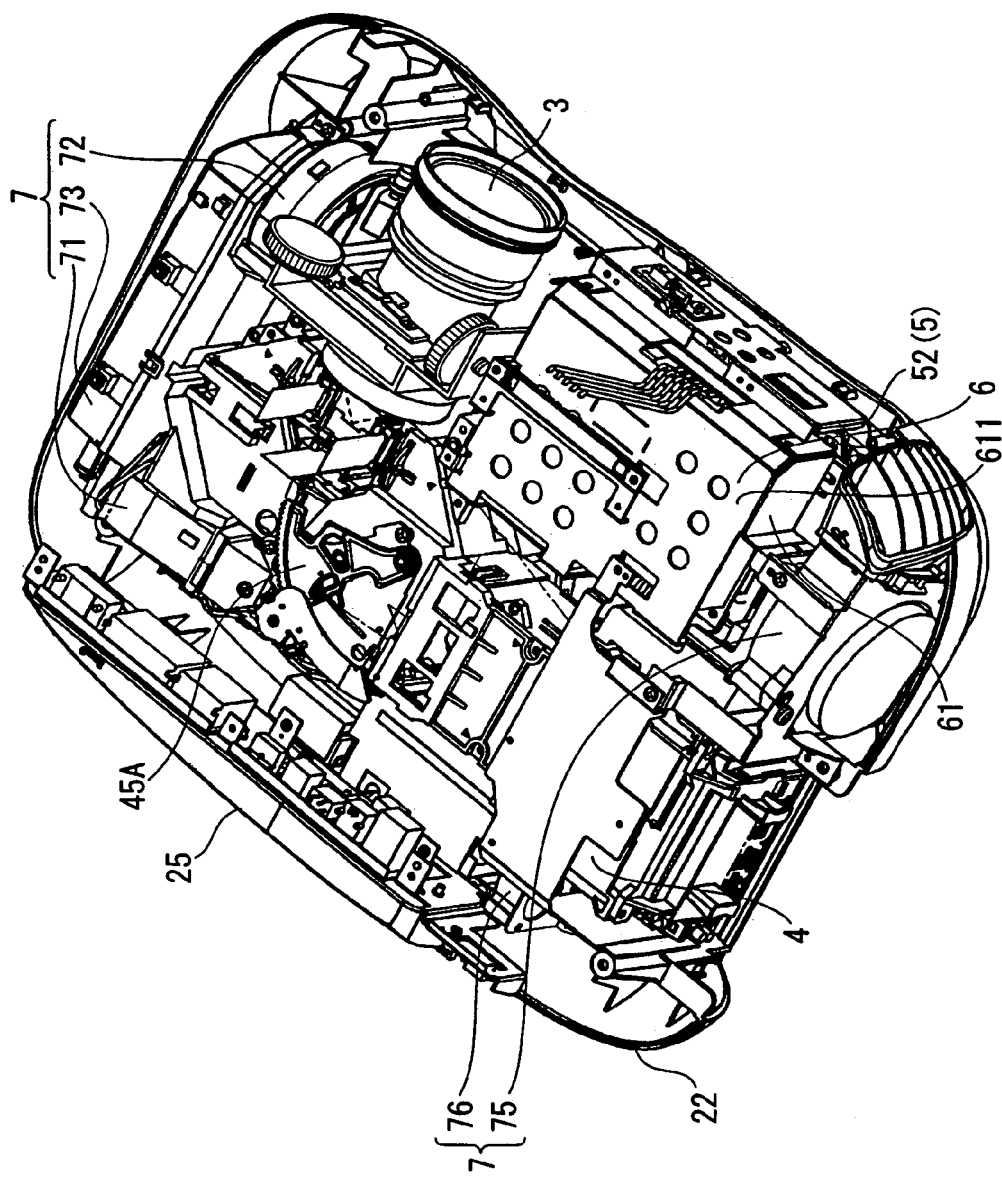
FIG. 5 is an illustration showing an internal configuration of the projector of the aforesaid embodiment.

FIGS. 3 and 5 are illustrations showing the internal configuration of the projector 1. More specifically, FIG. 3 is an illustration, in which the upper case 21, the front case 23 and the side case 24 are removed from the state of FIG. 1. FIG. 4 is an illustration, in which the upper shield plate is further removed from the state of FIG. 3. FIG. 5 is an illustration, in which the control board is further removed from the state of FIG. 4.

As shown in FIGS. 3 to 5, the device body of the projector 1 is housed inside the exterior case 2, the device body horizontally extending along the longitudinal direction of the exterior case 2 and including an optical unit 4 (FIG. 5) having substantially a L-shape in plane view with one of the ends extending to the front; control boards 5 respectively disposed above the optical unit 4 and inside the front case 23; a power supply unit 6 disposed inside the L-shape of the optical unit 4; and a cooling unit 7 (FIG. 5) for cooling the inside of the exterior case 2.

(2-1) Structure of Optical Unit 4

Figure 6:
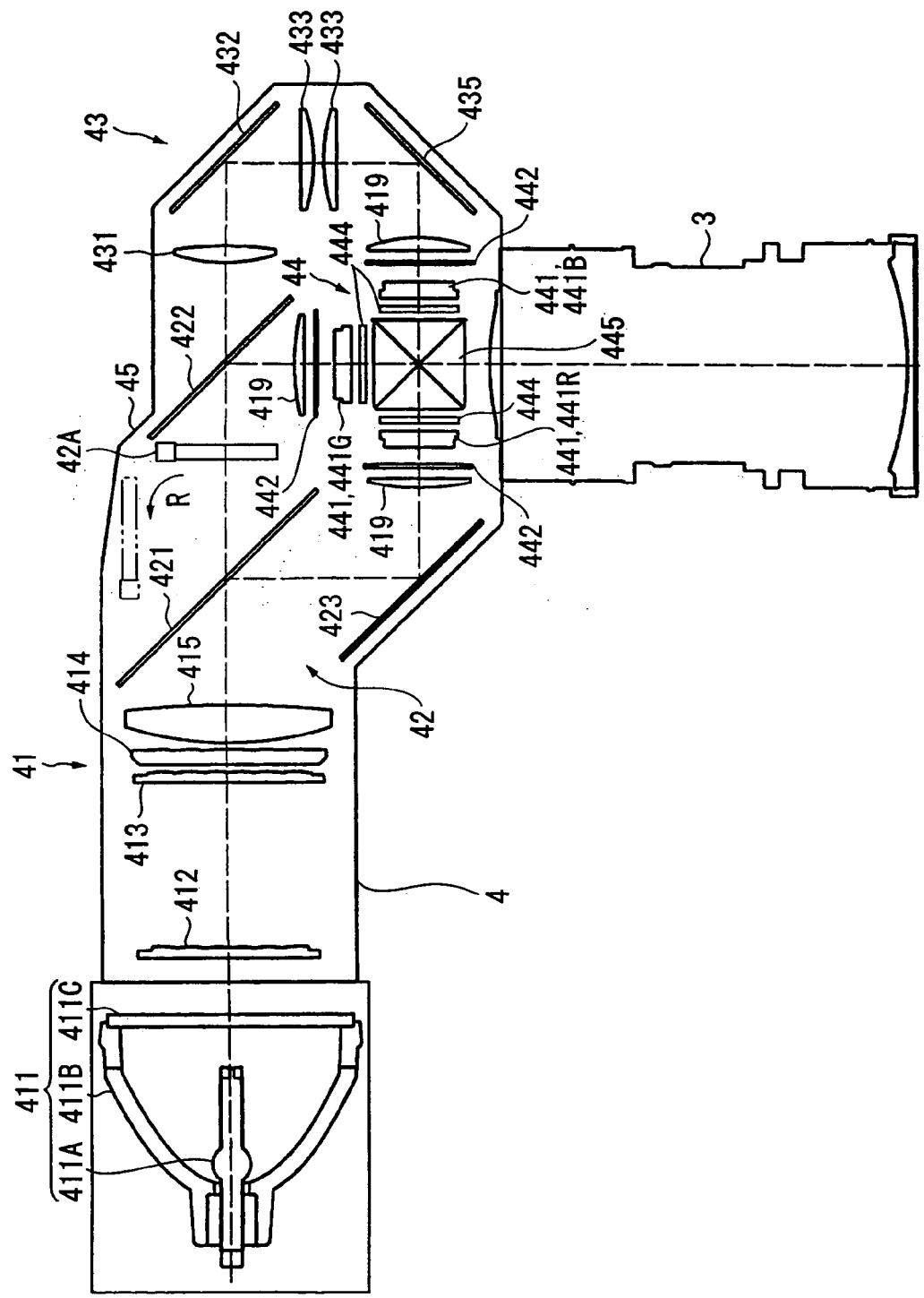
FIG. 6 is a schematic illustration showing an optical system of an optical unit of the aforesaid embodiment.

FIG. 6 is a schematic illustration showing an optical system of the optical unit 4.

The optical unit 4 modulates a light beam irradiated by a light source device in accordance with image information to form an optical image, and forms a projection image on a screen through the projection lens 3. As shown in FIG. 6, the optical unit 4 includes functionally independent components of an integrator illuminating optical system 41, a color-separating optical system 42, an optical filter 42A, a relay optical system 43, an optical device 44 integrating an optical modulator and a color-combining optical device, and a light guide 45 in which the optical components 41, 42, 42A, 43 and 44 are housed and arranged.

The integrator illumination optical system 41 is an optical system for equalizing the illuminance of the light beam irradiated by the light source on a plane orthogonal to an illumination optical axis. The integrator illuminating optical system 41 has a light source device 411, a first lens array 412, a second lens array 413, a polarization converter 414 and a superposing lens 415.

The light source device 411 has a light source lamp 411A (a radial light source), a reflector 411B, and an anti-explosion glass 411C covering a light-irradiation side of the reflector 411B. The radial light beam irradiated by the light source lamp 411A is reflected by the reflector 411B to be an approximately parallel light beam and is irradiated toward the outside. In the present embodiment, a high-pressure mercury lamp is used as the light source lamp 411A and a parabolic mirror is used as the reflector 411B. Incidentally, the light source lamp 411A may not be a high-pressure mercury lamp but may be a metal halide lamp or a halogen lamp. Further, though a parabolic mirror is used as the reflector 411B, a parallelizing concave lens disposed on the irradiation-side of a reflector of an ellipsoidal mirror may alternatively be used.

The first lens array 412 has small lenses arranged in a matrix, the lenses each having substantially rectangular profile seen in the illumination optical axis direction. The respective lenses separate the light beam irradiated by the light source lamp 411A into sub-beams and emit the sub-beams in the illumination optical axis direction.

The second lens array 413 is arranged approximately in the same manner as the first lens array 412, which includes small lenses arranged in a matrix. The second lens array 413 focuses the image of the small lenses of the first lens array 412 onto below-described liquid crystal panels of the optical device 44 together with the superposing lens 415.

The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 is substantially superposed on the below-described liquid crystal panels of the optical device 44 by the superposing lens 415. Since only one-type of polarized light can be used in a projector using the liquid crystal panel that modulates a polarized light, approximately half of the light beam from the light source lamp 411A emitting random polarized light cannot be used. Accordingly, with the use of the polarization converter 414, the light beam irradiated by the light source lamp 411A is converted into substantially uniform polarized light to enhance the light utilization efficiency of the optical device 44. Incidentally, such polarization converter 414 is disclosed in, for instance, JP08-304739A.

The color-separating optical system 42 has two dichroic mirrors 421 and 422, and a reflection mirror 423. The plurality of sub-beams irradiated by the integrator illuminating optical system 41 are separated into three-color lights of red (R), green (G) and blue (B) by the two dichroic mirrors 421 and 422.

The optical filter 42A is disposed between the two dichroic mirrors 421 and 422 for correcting spectrum of the light beam passed through the dichroic mirror 421. The optical filter 42A avoids deterioration of contrast for the projection image by correcting the spectrum of color light with its light intensity is relatively high (for example, green light and blue light etc.). Though not shown in detail, the optical filter 42A has a glass substrate made of a blue glass sheet, a white glass sheet or the like, and an optical conversion film in which two types of thin films having different refractive indexes are alternately layered on a surface of the glass substrate.

Further, the optical filter 42A is moved between positions on and out an optical path of the light beam by a filter moving mechanism 45A (FIG. 5) provided in the light guide 45. In other words, the optical filter 42A is disposed on the illumination optical axis to be substantially perpendicular to the illumination optical axis. In this state, as shown by an arrow R in FIG. 6, the filter moving mechanism 45A causes the optical filter 42A to slide to the outside of the optical path in the light guide 45 with the posture of the optical filter 42A being changed.

The relay optical system 43 has an incident-side lens 431, a pair of relay lenses 433, and reflection mirrors 432 and 435. The relay optical system 43 guides the color light (blue light) separated by the color-separating optical system 42 toward the below-described liquid crystal panel for blue light of the optical device 44.

At this time, the dichroic mirror 421 of the color-separating optical system 42 transmits the green light component and blue light component of the light beam irradiated by the integrator illuminating optical system 41 and reflects the red light component. The red light reflected by the dichroic mirror 421 is reflected by the reflection mirror 423, and then reaches to the liquid crystal panel for red light after passing through a field lens 419. The field lens 419 converts the respective sub-beams irradiated by the second lens array 413 into a light beam parallel to the central axis (main beam) thereof. The field lenses 419 provided on the light-incident sides of the liquid crystal panels for blue and green lights function in the same manner as described above.

In the blue and green lights transmitted through the dichroic mirror 421, the green light is reflected by the dichroic mirror 422, and reaches to the liquid crystal panel for green light after passing through the field lens 419. On the other hand, the blue light passes through the dichroic mirror 422 and the relay optical system 43, and reaches to the liquid crystal panel for blue light after passing through the field lens 419.

Incidentally, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 419. Incidentally, though the blue light of the three-color lights passes through the relay optical system 43, the red light, for instance, may alternatively pass through the relay optical system 43.

The optical device 44 modulates the incident light beam in accordance with image information to form a color image.

The optical device 44 has three incident-side polarization plates 442 on which the respective color lights separated by the color-separating optical system 42 are incident, the liquid crystal panels 441 (assuming 441R for red light, 441G for green light and 441B for blue light) as optical modulators and irradiate-side polarization plates 444 respectively disposed on the downstream of the respective incident-side polarization plates 442, and a cross dichroic prism 445.

The liquid crystal panels 441R, 441G and 441B use, for instance, a polycrystalline silicon TFF (Thin Film Transistor) as a switching element, which has a pair of opposing transparent substrates with liquid crystal sealed therebetween. The liquid crystal panels 441R, 441G and 441B irradiate the light beam incident thereon through the incident-side polarization plates 442 after modulating the light beam in accordance with image information.

The incident-side polarization plate 442 only transmits a polarized light in a predetermined direction out of the respective color lights separated by the color-separating optical system 42 and absorbs other light beam, the incident-side polarization plate 442 having a substrate made of sapphire glass or the like with a polarization film attached thereon.

The irradiation-side polarization plate 444 is also arranged substantially in the same manner as the incident-side polarization plate 442, which only transmits the polarized light in a predetermined direction out of the light beam irradiated by the liquid crystal panels 441R, 441G and 441B, the polarization axis of the transmitted polarized light being set orthogonal to the polarization axis of the polarized light transmitted through the incident-side polarization plate 442.

The cross dichroic prism 445 combines the optical image irradiated by the irradiation-side polarization plate 444 and modulated for each color light to form a color image. In the cross dichroic prism 445, a dielectric multi-layer film for reflecting the red light and a dielectric multi-layer film for reflecting the blue light are formed along the boundaries of four right-angle prisms approximately in X-shape, the dielectric multi-layer films combining the three color lights.

The above-described liquid crystal panels 441R, 441G and 441B, the irradiation-side polarization plates 444 and the cross dichroic prism 445 are integrated as a unit.

Figure 7:
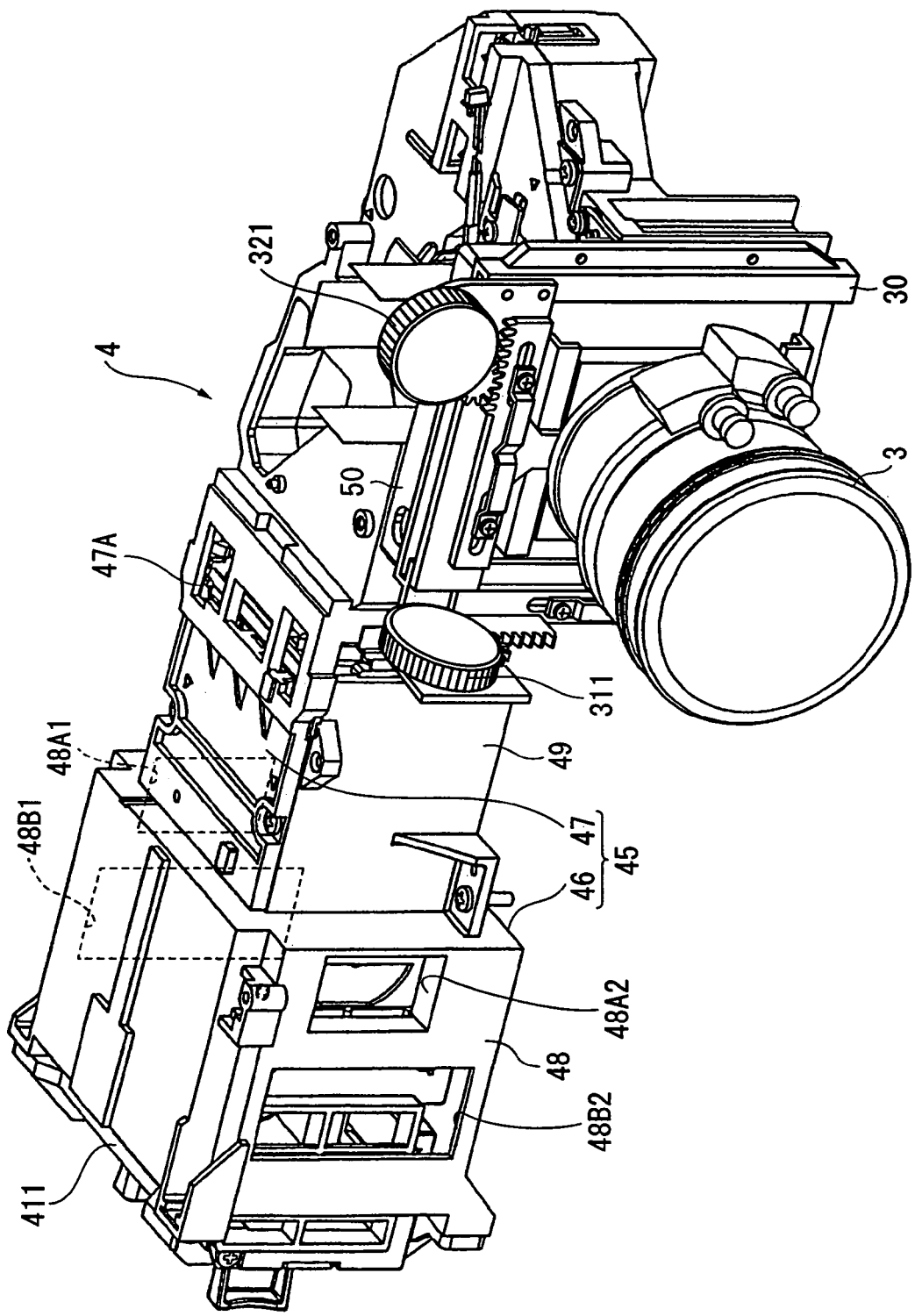
FIG. 7 is an illustration showing a structure of a light guide of the aforesaid embodiment.

FIG. 7 is an illustration showing the structure of the light guide 45. In FIG. 7, the above-described filter moving mechanism 45A is removed.

The light guide 45 is a synthetic resin component formed by injection molding or the like, which includes a lower light guide 46 in which the above-described optical components 41, 42, 42A, 43 and 44 are housed, and a lid-shaped upper light guide 47 for closing an upper opening of the lower light guide 46.

The lower light guide 46 has a light source housing 48 in which the light source device 411 is housed, and a component housing 49 formed as a container in which optical components other than the light source device 411 are housed.

The light source housing 48 has an approximately box-shape, and openings are respectively formed on an end surface near the component housing 49 and on the other end surface opposite thereto. The opening formed on the end surface near the component housing 49 transmits the light beam irradiated by the light source device 411. The opening formed on the other end surface opposite to the end surface near the component housing 49 serves as an opening through which the light source device 411 is housed by inserting from the lateral side of the light source housing 48.

As shown in FIG. 7, inflow openings 48A1, 48B1 and outflow openings 48A2, 48B2 for circulating the cooling air through the light source housing 48 are respectively formed on the front and the rear end surfaces of the light source housing 48, the inflow openings 48A1, 48B1 and the outflow openings 48A2, 48B2 respectively being opposite to each other.

The component housing 49 is an approximately rectangular parallelepiped with an upper side thereof being opened, an end thereof being connected to the light source housing 48. A head 50 on which the projection lens 3 is fixed by screws is attached to the other end of the component housing 49. The head 50 places the projection lens 3 at a predetermined position on the illumination optical axis set inside the light guide 45.

Though not specifically shown, a plurality of grooves for fitting the optical components 412 to 415, 419, 421 to 423 and 431 to 435 by sliding them from the above are formed on the component housing 49. The optical device 44 is placed at a part of the component housing 49 adjacent to the head 50.

Though not shown in detail, openings are formed on a bottom side of the component housing 49 at the positions respectively corresponding to the liquid crystal panels 441R, 441G and 441B of the optical device 44 as well as to the polarization converter 414. Through these openings, the cooling air can be circulated inside the light guide 45 by the below-described cooling unit 7.

The upper light guide 47 closes an upper opening of the component housing 49 of the lower light guide 46, but does not close a part above the optical device 44. A plurality of openings 47A are formed on the upper light guide 47 by penetrating through it, so that the air having cooled the inside of the light guide 45 is discharged from the openings 47A.

(2-2) Structure of Control Board 5

As shown in FIG. 4, the control boards 5 includes a main board 51 disposed above the optical unit 4 and a sub board 52 disposed between the front case 23 and the power supply unit 6.

The main board 51 is a circuit board having a processor such as a CPU (Central Processing Unit) mounted thereon, which entirely controls the operation of the projector 1. The main board 51 controllably drives the liquid crystal panels 441R, 441G and 441B based on the signal output by the above-described interface board. The liquid crystal panels 441R, 441G and 441B modulate the light beam to form an optical image. Further, operation signals output by the circuit board of the above-described operation panel 26 and the non-illustrated remote controller module is input to the main board 51 and the main board 51 then outputs a control command to the components of the projector 1 based on the operation signals.

Further, as shown in FIG. 3, an upper shield plate 8A made of aluminum as a shield member having an L-shape in plane view is attached above the main board 51. The upper shield plate 8A shields not only the electromagnetic wave radiated by the circuit element mounted on the control board 5 but also external electromagnetic wave, thereby avoiding electromagnetic interference.

The sub board 52 is a board on which a fan driving circuit for driving a plurality of cooling fans constituting the below-described cooling unit 7 is mounted, the sub board 52 being electrically connected with the main board 51 for driving the cooling fan by inputting a control command output from the main board 51.

Besides, a shield plate 8B made of aluminum connected with the upper shield plate 8A attached above the main board 51 is attached to the sub board 52 for covering the sub board 52.

The shield plates 8A and 8B may be made of a metal other than aluminum, or may alternatively be made of synthetic resin or the like of which surface is plated, processed by metal evaporation or attached with a metal foil.

(2-3) Structure of Power Supply Unit 6

As shown in FIGS. 3 to 5, the power supply unit 6 for supplying the electric power to the light source device 411 and the control board 5 etc., is disposed along the longitudinal direction of the front case 23 of the exterior case 2. The power supply unit 6, as shown in FIGS. 3 to 5, has a power supply block 61 containing a power supply circuit, a lamp drive block (not shown) disposed below the power supply block 61.

The power supply block 61 supplies the electric power supplied from the outside through a power cable connected to the inlet connector 27 (FIG. 2) to the lamp drive block and the control boards 5 etc. The power supply block 61 has a circuit board having a transformer for converting the input alternating-current into a low-voltage direct-current and the like, a converter for converting the output of the transformer into a predetermined voltage on one side thereof, and a tube component 611 covering the circuit board. The tube component 611 is made of aluminum and is formed in an approximately box-shape with both ends being opened.

The lamp drive block has a circuit board, on which a converter for supplying the electric power to the above-described light source device 411 at a constant voltage is mounted on one side. The commercial alternating-current electricity input from the power source block 61 is commutated and converted into the direct-current or the rectangular wave alternating-current by the lamp drive block to be supplied to the light source device 411 (FIG. 6). The lamp drive block includes a tube component covering the circuit board like the tube component 611 of the power supply block 61.

(2-4) Structure of Cooling Unit 7

Figure 8:
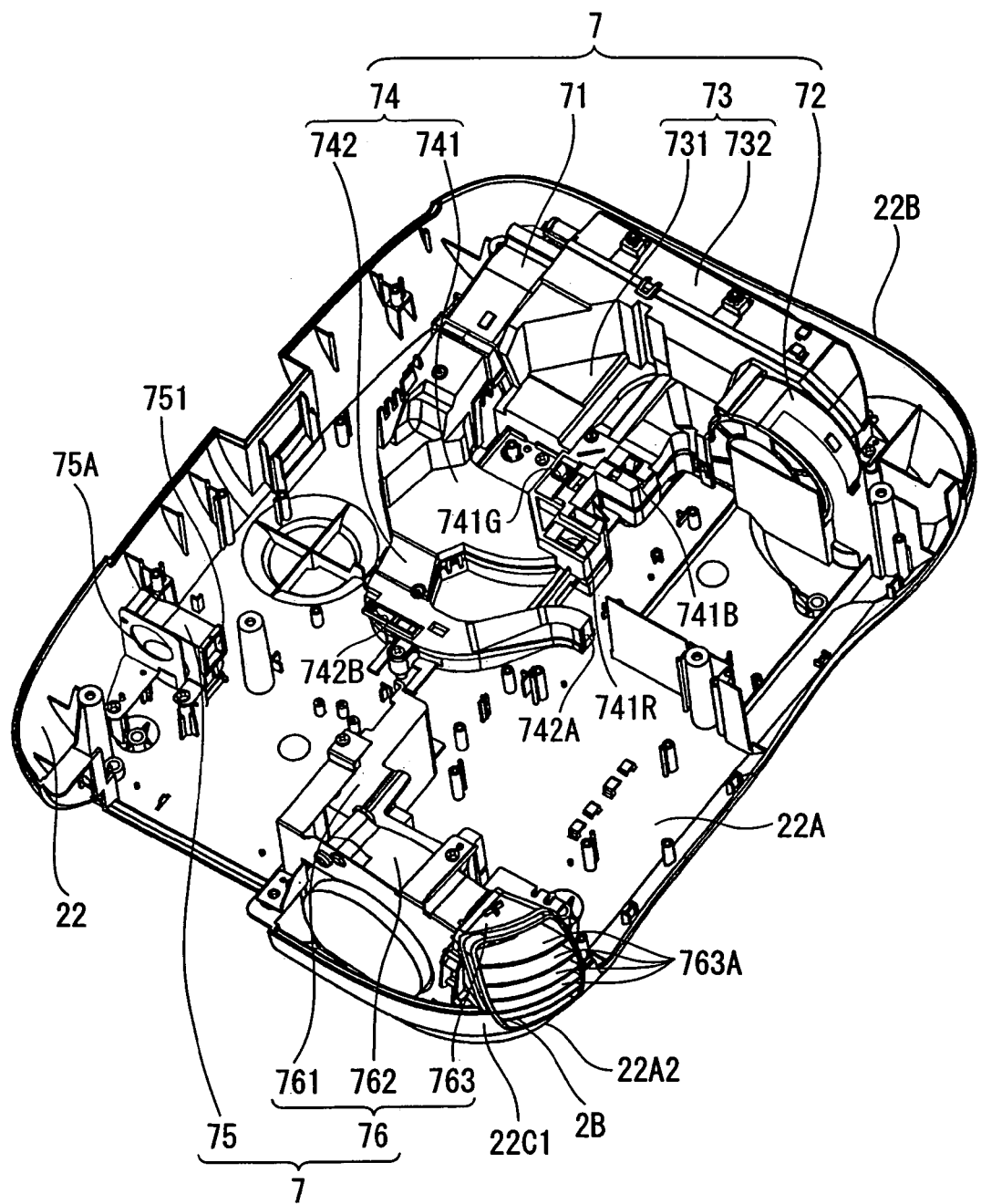
FIG. 8 is an illustration showing a configuration of a cooling unit of the aforesaid embodiment.

FIG. 8 is an illustration showing the configuration of the cooling unit 7. More specifically, FIG. 8 is an illustration, in which the rear case 25, the optical unit 4 and the power supply unit 6 are removed from the state of FIG. 5.

The cooling unit 7 cools the heat sources inside the projector 1. As shown in FIG. 8, the cooling unit 7 includes sirocco fans 71 and 72 for introducing the cooling air to the inside of the projector 1 from the outside; a suction-side duct 73 for introducing the cooling air flowed inside the projector 1 through the suction hole 2A (FIG. 2) formed on the bottom side 22A of the lower case 22 to respective suction holes of the sirocco fans 71 and 72; a discharge-side duct 74 connected with respective discharge holes of the sirocco fans 71 and 72 for introducing the cooling air to the inside of the optical unit 4 and toward the power supply unit 6; a sirocco fan 75 for blowing the air to the light source device 411; and an exhaust unit 76 for exhausting the air inside the projector 1 to the outside.

The sirocco fan 71 is located behind the suction hole 2A (FIG. 2) formed on the bottom side 22A of the lower case 22. A suction side of the sirocco fan 71 for sucking the cooling air is disposed along a plane orthogonal to an optical path plane (plane along the bottom side 22A of the lower case 22) defined by the light source device 411, the optical device 44 and the cross dichroic prism 445. More specifically, a suction hole of the sirocco fan 71 for sucking the cooling air faces to the front, while a discharge hole thereof for discharging the sucked cooling air faces leftward in front view.

The sirocco fan 72 is located at the side of the projection lens 3 with a suction side thereof for sucking the cooling air arranged along a plane orthogonal to the optical path plane, in the same manner as the sirocco fan 71. To be more specific, a suction hole of the sirocco fan 72 for sucking the cooling air faces rightward in front view, while a discharge hole thereof for discharging the sucked cooling air faces to the rear side along the bottom side 22A.

The suction-side duct 73 is configured by a hollow component, through which the cooling air can circulate, and arranged along a lower surface and a right end surface in front view of the optical unit 4. The suction-side duct 73 includes a first suction-side duct 731 for introducing the cooling air passing through the suction hole 2A (FIG. 2) to the inside of the suction-side duct 73, and a second suction duct 732 connected with the first suction-side duct 731 for circulating the cooling air introduced to the first suction-side duct 731 to the respective suction holes of the sirocco fans 71 and 72.

The first suction-side duct 731 is substantially rectangular parallelepiped with an opening (not shown) formed on one of end surfaces connected to the suction hole 2A (FIG. 2), and is disposed below the optical unit 4.

The second suction-side duct 732 is connected to an end of the first suction-side duct 731 so that the cooling air can be circulated, the second suction-side duct 732 being substantially rectangular parallelepiped substantially orthogonal to the first suction-side duct 731 and extending along the lateral sides 21B and 22B of the exterior case 2. The second suction-side duct 732 is provided with an opening (not shown) connected to the suction hole of the sirocco fan 71 at an end thereof, and an opening (not shown) connected to the suction hole of the sirocco fan 72 at the other end thereof, so that the cooling air introduced to the first suction-side duct 731 is circulated to the respective suction holes of the sirocco fans 71 and 72.

The discharge-side duct 74 is configured by a hollow component, through which the cooling air can circulate, and disposed below the optical unit 4 along the bottom side 22A of the lower case 22. The discharge-side duct 74 is connected to the respective discharge holes of the sirocco fans 71 and 72, the discharge-side duct 74 including a first discharge-side duct 741 for introducing the cooling air to the optical device 44 of the optical unit 4, and a second discharge-side duct 742 connected to the first discharge-side duct 741 for introducing the cooling air toward the polarization converter 414 of the optical unit 4 and the power supply unit 6.

The first discharge-side duct 741 is provided with an opening (not shown) connected to the discharge hole of the sirocco fan 71 at an end thereof, and an opening (not shown) connected to the discharge hole of the sirocco fan 72 at the other end thereof, the first discharge-side duct 741 being formed substantially in a U-shape in plane view. Besides, three outflow holes 741R, 741G and 741B are formed on an upper surface of the first discharge-side duct 741 at positions corresponding to the optical device 44. Though not shown in detail, a partition defining the side of the outflow hole 741R and the side of the outflow holes 741G and 741B is formed inside the first discharge-side duct 741.

The second discharge-side duct 742 is connected to the lateral surface of the first discharge side duct 741 at an end thereof such that the cooling air can circulate, and formed substantially in a U-shape in plane view at the other end extending toward the power supply unit 6. The second discharge-side duct 742 is provided with an outflow hole 742A at the other end thereof, and an outflow hole 742B at a position corresponding to the polarization converter 414 located at an upper surface thereof.

The sirocco fans 71 and 72, the suction-side duct 73 and the discharge-side duct 74 are integrated as a unit, and fixed on the bottom side 22A of the lower case 22 by a screw or the like.

The sirocco fan 75 is located beside the light source device 411 with a suction side for sucking the cooling air arranged along a plane orthogonal to the optical path plane, in the same manner as the sirocco fans 71 and 72. More specifically, a suction hole of the sirocco fan 75 for sucking the cooling air faces rightward in front view, while a discharge hole 751 for discharging the sucked cooling air faces to the inflow opening 48A1 (FIG. 7) formed in the light source housing 48 of the light guide 45. The sirocco fan 75 is fixed to the bottom side 22A of the lower case 22 by a screw or the like with the use of a fan fixture 75A.

The exhaust unit 76 is housed and arranged in the dent defined by the bulged portion 22A2 formed on the bottom side 22A of the lower case 22 and the bulged portion 22C1 formed on the lateral side 22C of the lower case 22. The exhaust unit 76 includes a sirocco fan 762 arranged such that a suction side thereof is along a plane orthogonal to the optical path plane, a suction hole thereof faces rightward in front view, and a discharge hole thereof faces to the front; an exhaust-side duct 761 arranged to face to the side of the light source device 411 for introducing the air heated via the light source device 411 toward the suction hole of the sirocco fan 762; and a louver 763 that has a plurality of blades 763A, the louver 763 being connected to the discharge hole of the sirocco fan 762 and engaged with the exhaust hole 2B of the exterior case 2. The exhaust side duct 761, the sirocco fan 762, and the louver 763 are integrated as a unit, and fixed on the bottom side 22A of the lower case 22 by a screw or the like.

Incidentally, the detailed structure of the exhaust unit 76 will be described below.

(3) Structure of Exhaust Unit 76

Figure 9:
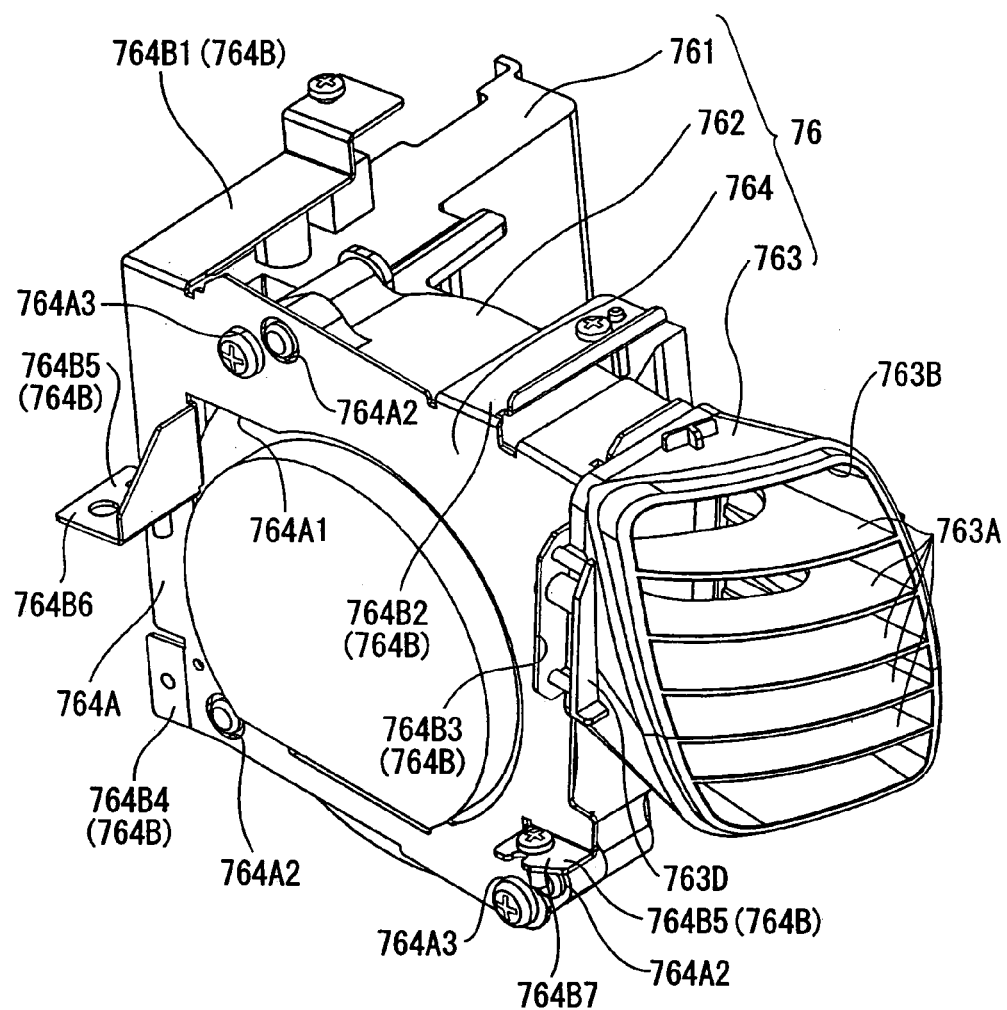
FIG. 9 is an illustration showing a structure of an exhaust unit of the aforesaid embodiment.
Figure 10:
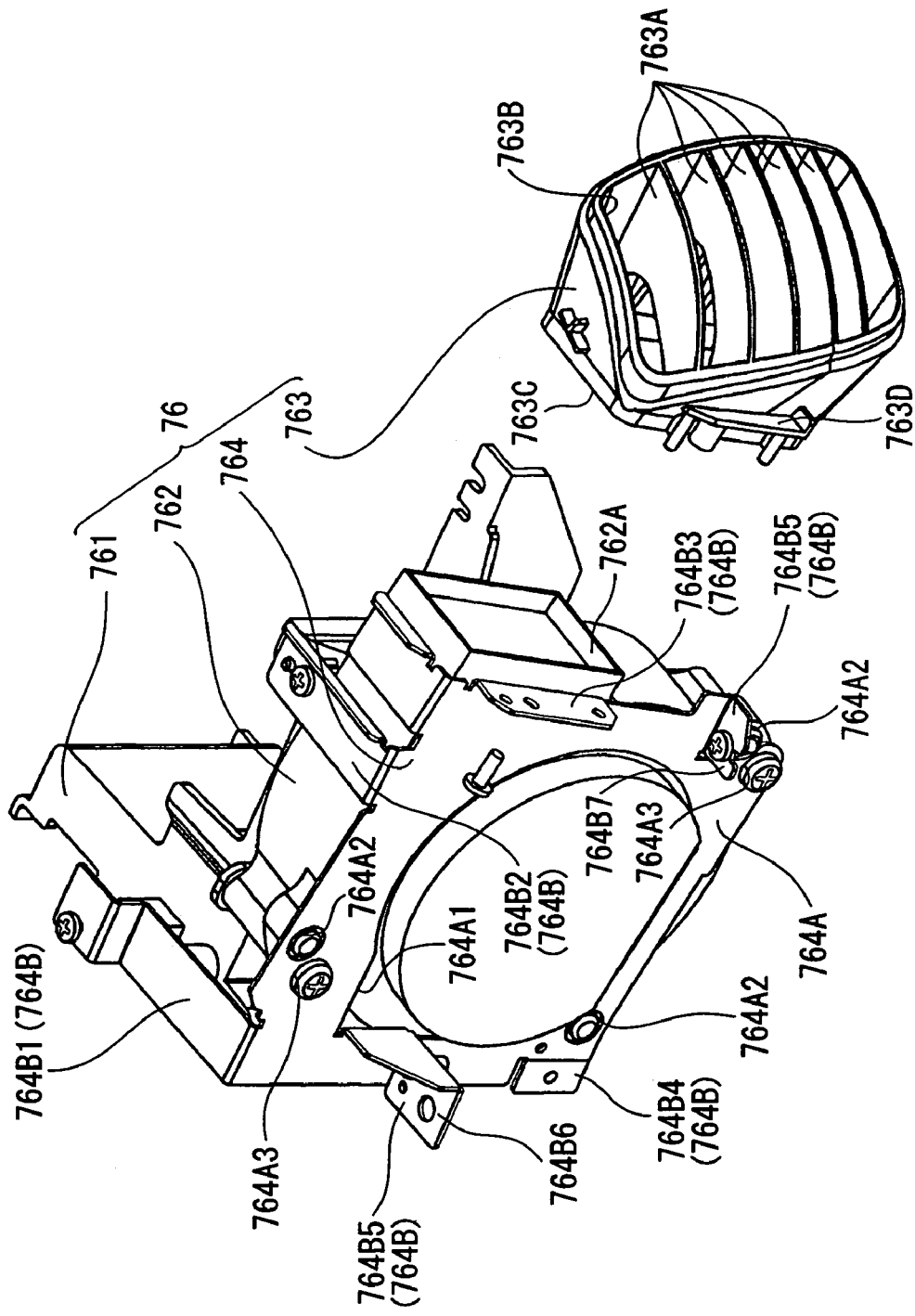
FIG. 10 is an illustration showing a structure of the exhaust unit of the aforesaid embodiment.
Figure 11:
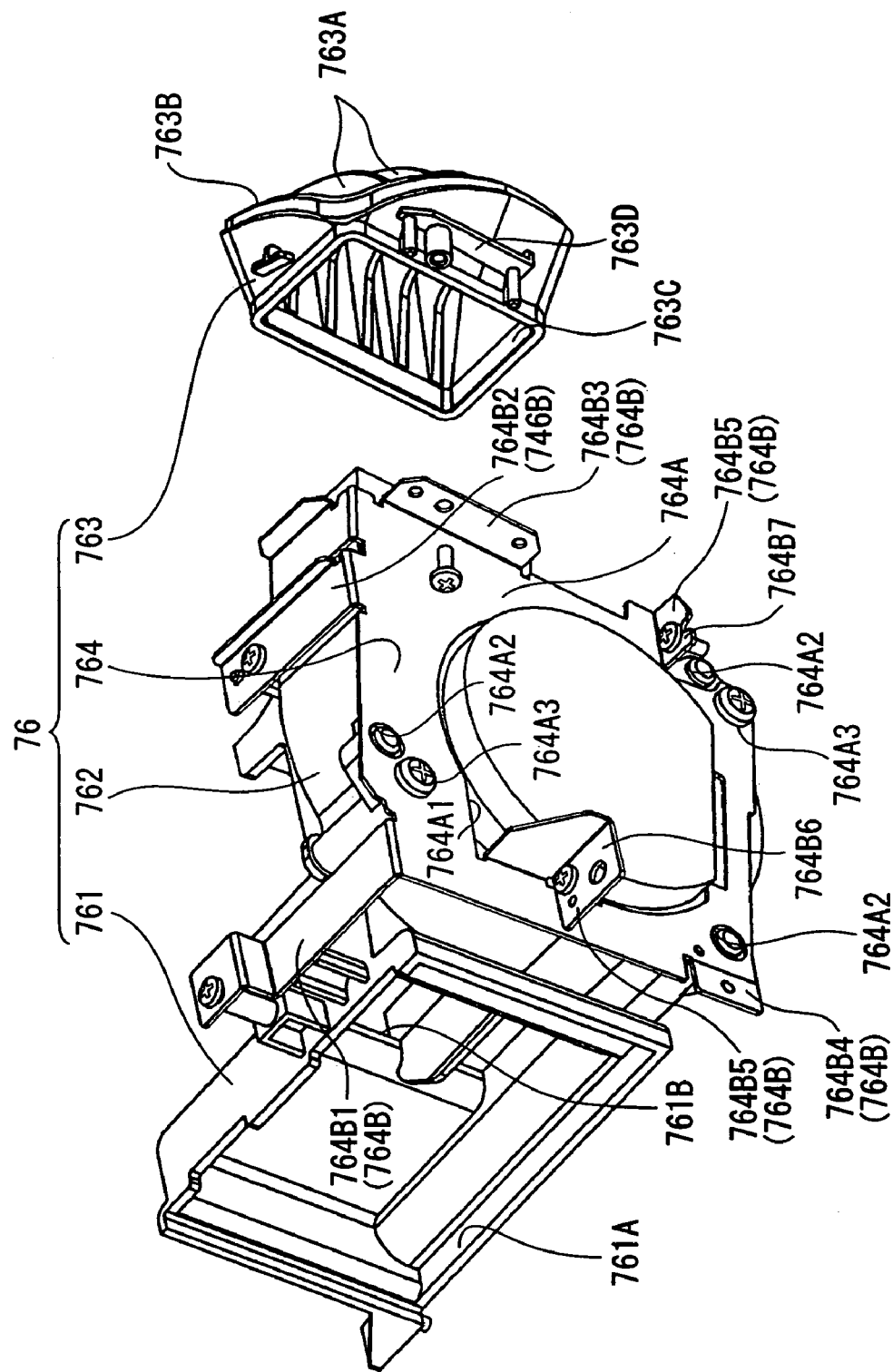
FIG. 11 is an illustration showing a structure of the exhaust unit of the aforesaid embodiment.

FIGS. 9 to 11 each show the structure of the exhaust unit 76. To be more specific, FIG. 9 is a perspective view showing the upper front side of the exhaust unit 76. FIG. 10 is an exploded perspective view showing the upper front side of the exhaust unit 76, from which the louver 763 is disassembled. FIG. 11 is an exploded perspective view showing the upper rear side of the exhaust unit 76, from which the louver 763 is disassembled.

As shown in FIG. 9, the exhaust unit 76 has a structure in which the exhaust-side duct 761, the sirocco fan 762 and the louver 763 are integrated as a unit by the fan fixture 764.

As shown in FIGS. 9 to 11, the exhaust-side duct 761 is formed in a substantially rectangular parallelepiped.

An intake hole 761A (FIG. 11) is formed allover one of the end surfaces of the exhaust-side duct 761, i.e., an end surface facing to the light source device 411. An exhaust hole 761B (FIG. 11) is formed on the other end surface on the left side in front view.

Because of the above-described shape, the exhaust-side duct 761 shields the light irradiated by the light source device 411 and deviated from the illumination optical axis, so that the leaked light is prevented from heading toward the exhaust hole 2B of the exterior case 2.

Figure 12:
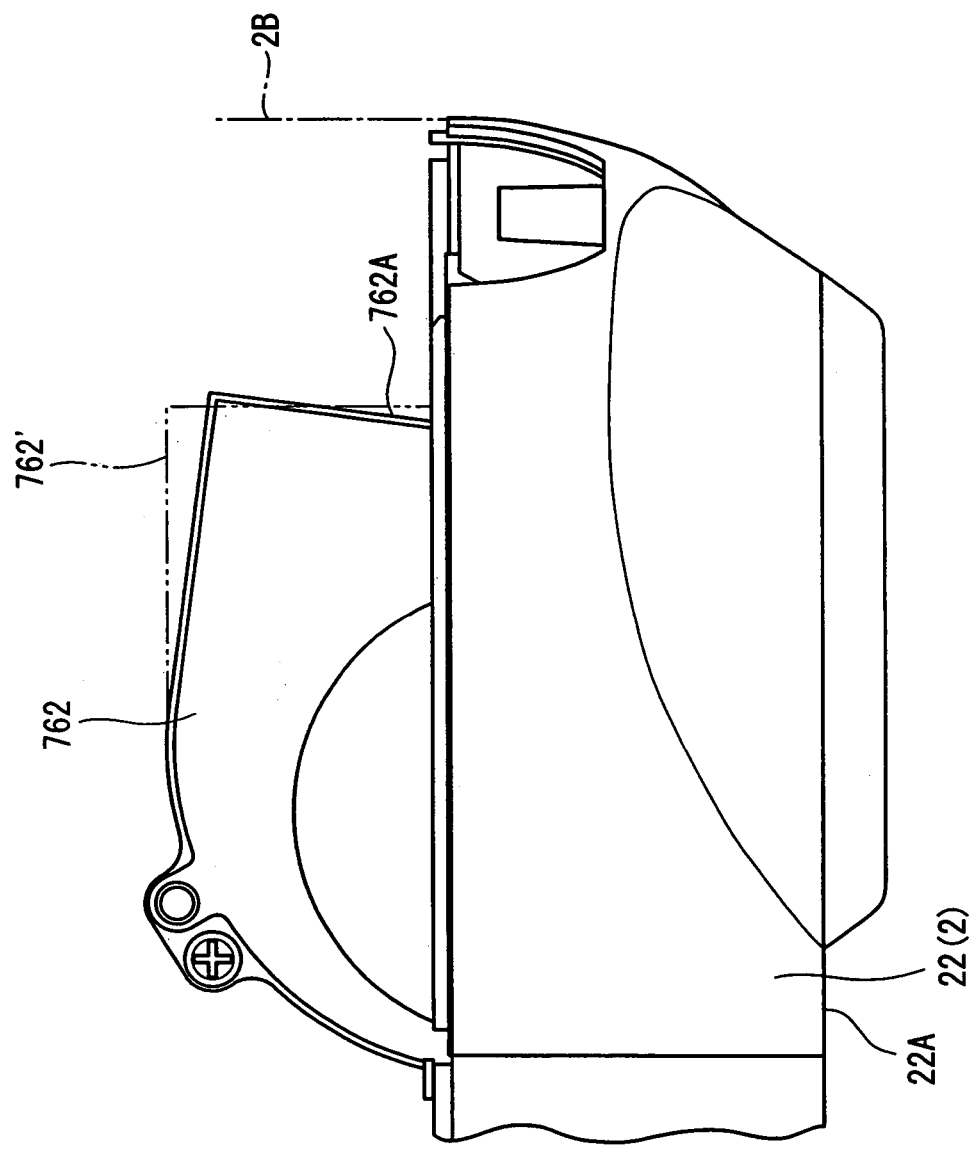
FIG. 12 is an illustration showing an arranging state of a sirocco fan of the exhaust unit of the aforesaid embodiment.

FIG. 12 is an illustration showing an arranging state of the sirocco fan 762 of the exhaust unit 76.

As shown in FIG. 12, the sirocco fan 762 is so disposed that the discharge hole 762A is inclined downward to face to the substantial center of the end surface with the exhaust hole 2B formed in a thickness direction, in compared to a position of a sirocco fan 762' when the discharge hole 762A of the sirocco fan 762 is arranged orthogonal to the bottom side 22A. Though not shown in detail, the sirocco fan 762 is so arranged that the suction side thereof is along a plane orthogonal to the optical path plane and inclined relative to the projection direction, so that the air discharged from the discharge hole 762A flows in a direction away from the projection direction.

As shown in FIGS. 9 to 11, the louver 763 is formed substantially in a cylindrical shape, both ends of which are opened so that the air can circulate at the inside.

A plurality of blades 763A extending in a horizontal direction for rectifying in a predetermined direction the air discharged from the sirocco fan 762 are formed at the opening 763B of the front side of the louver 763.

As shown in FIG. 10 or 11, the opening 763C of the rear side of the louver 763 has a dimension slightly larger than that of the discharge hole 762A (FIG. 10) of the sirocco fan 762 so as to insert and fit to the discharge hole 762A. When the exhaust unit 76 is integrated, the opening 763C of the louver 763 is inserted and fitted to the discharge hole 762A of the sirocco fan 762 with a buffer material (not shown) being interposed. That is, a tube component of the present invention corresponds to the opening 763C.

Further, a fixture 763D for fixing the louver 763 to the fan fixture 764 is formed on a lateral end surface on the left side in front view. The louver 763 is supported in a cantilevered manner by the fixture 763D relative to the fan fixture 764.

As shown in FIGS. 9 to 11, the fan fixture 764 is made of an aluminum plate by sheet metal processing, and disposed at an end surface opposite to the suction hole of the sirocco fan 762. The fan fixture 764 includes a substantially rectangular plate member 764A and a fixture 764B formed by bending a part of the plate member 764A.

Formed at the plate member 764A, by cutting or the like, are an opening 764A1, for loosely fitting a part of the sirocco fan 762 at the substantial center, three positioning holes 764A2 for positioning the sirocco fan 762 at the peripheral edge of the opening 764A1, and two fixing holes 764A3 for fixing the sirocco fan 762.

The fixture 764B includes a duct fixture 764B1 for fixing the exhaust-side duct 761, a fan fixture 764B2 for fixing the sirocco fan 762, a louver fixture 764B3 for fixing the louver 763, a lamp cover fixture 764B4 for fixing the side case 24, and a device fixture 764B5 for fixing the exhaust unit 76 on the bottom side 22A of the lower case 22.

The duct fixture 764B1 is a part bending from a corner of an upper rear edge of the plate member 764A toward the sirocco fan 762, so that an upper end of the exhaust-side duct 761 is fixed by a screw.

The fan fixture 764B2 is a part bending from the substantial center of the upper edge of the plate member 764A toward the sirocco fan 762, so that an upper end of the sirocco fan 762 is fixed by a screw.

The louver fixture 764B3 is a part bending from an upper portion of a front edge of the plate member 764A toward the side opposite to the sirocco fan 762, so that the fixture 763D of the louver 763 is fixed by a screw to support and fix a lateral end surface of the louver 763.

Figure 13:
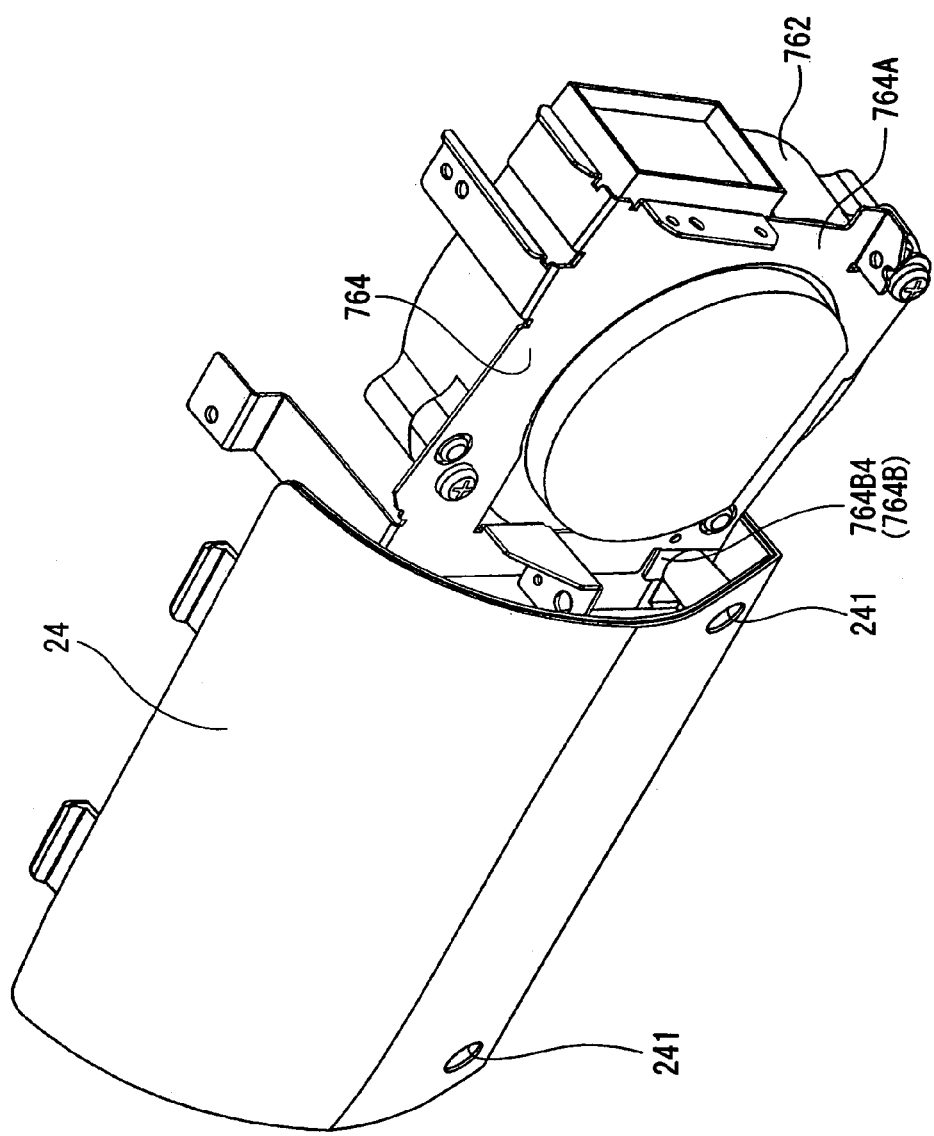
FIG. 13 is an illustration showing a fixing state of a side case by a lamp cover fixture of a fan fixture of the aforesaid embodiment.

FIG. 13 is an illustration showing a fixing state of the side case 24 by the lamp cover fixture 764B4 of the fan fixture 764.

The lamp cover fixture 764B4 is formed on a lower portion of a rear edge of the plate member 764A, and as shown in FIG. 13, a screw (not shown) is inserted to the fixing hole 241 formed on the lower side of the side case 24 to fix the side case 24 by screwing with the screw.

The device fixture 764B5 includes a first device fixture 764B6 formed by bending a part, which is formed when the opening 764Al is cut, and a second device fixture 764B7 formed by bending a corner at the front side of a lower front edge of the plate member 764A toward the side opposite to the sirocco fan 762.

The first device fixture 764B6 is located at a rear upper portion of the peripheral edge of the opening 764A1, the first device fixture 764B6 being bent at a part, which is formed when the opening 764Al is cut, toward the side opposite to the sirocco fan 762, and the lower edge of the part being bent by approximately ninety degrees so that this bent part is substantially parallel to the bottom side 22A of the lower case 22. The first device fixture 764B6 is fixed to a rib (not shown) formed on the bottom side 22A of the lower case 22 by a screw.

Figure 14:
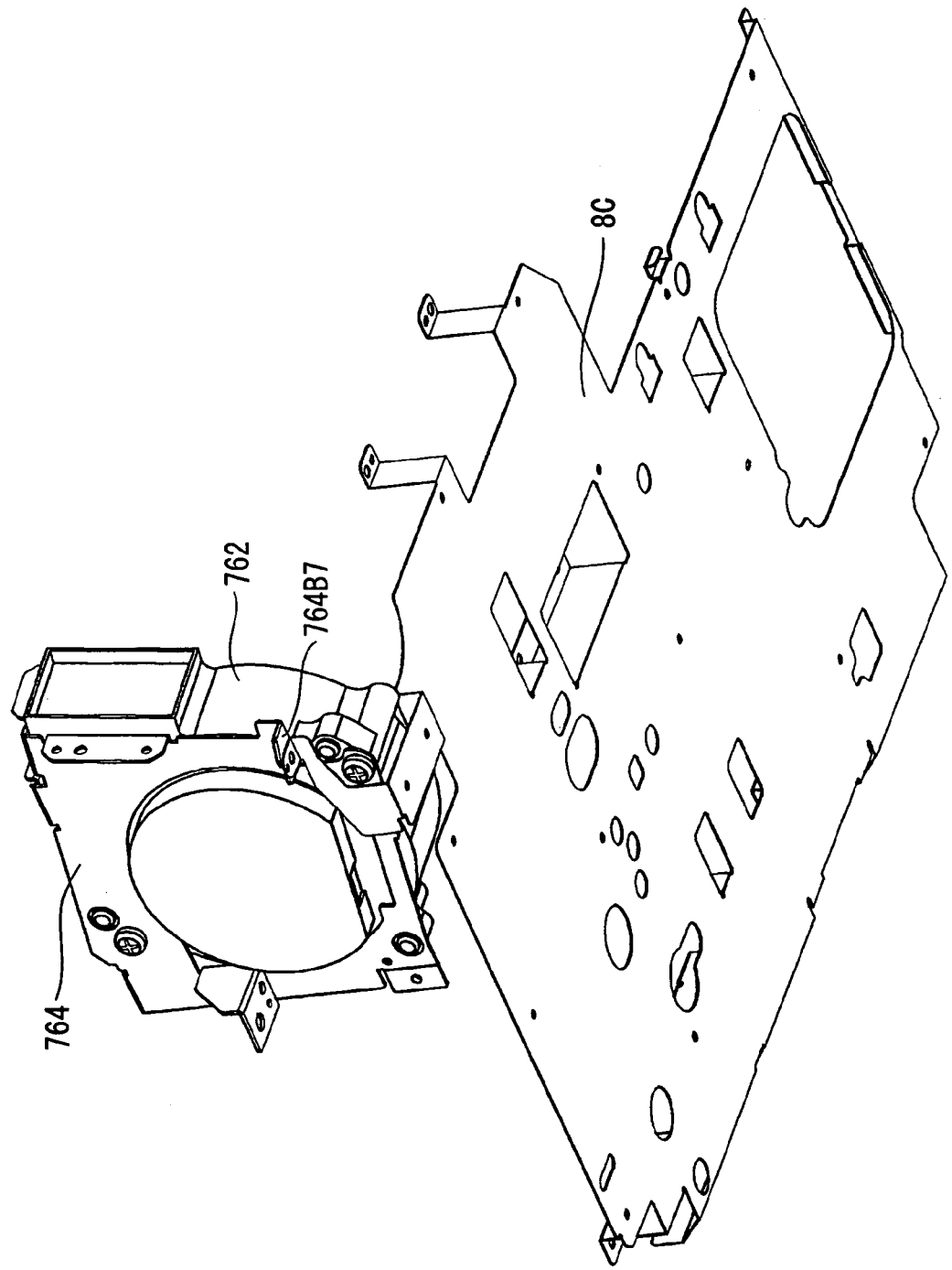
FIG. 14 is an illustration showing a connecting state of the fan fixture with a lower shield plate of the aforesaid embodiment.

FIG. 14 is an illustration showing a connecting state of the fan fixture 764 with the lower shield plate 8C.

The second device fixture 764B7 is formed such that its bent part is substantially parallel to the bottom side 22A of the lower case 22, the bent part being fixed to a rib (not shown) formed on the bottom side 22A of the lower case 22.

As shown in FIG. 14, a lower surface of the second device fixture 764B7 is made of aluminum like the upper shield plate 8A, and connected to the lower shield plate 8C, which is a shield member arranged along the lower surface of the device body of the projector 1 by a screw or the like, in an electrically conductive manner.

Though not shown in detail, the above-described upper shield plate 8A and the lower shield plate 8C are set to the ground potential, and consequently the fan fixture 764 electrically connected to the lower shield plate 8C is also set to the ground potential like the lower shield plate 8C.

(4) Cooling Structure

Next, the cooling structure inside the projector 1 by the cooling unit 7 will be described below.

Figure 15:
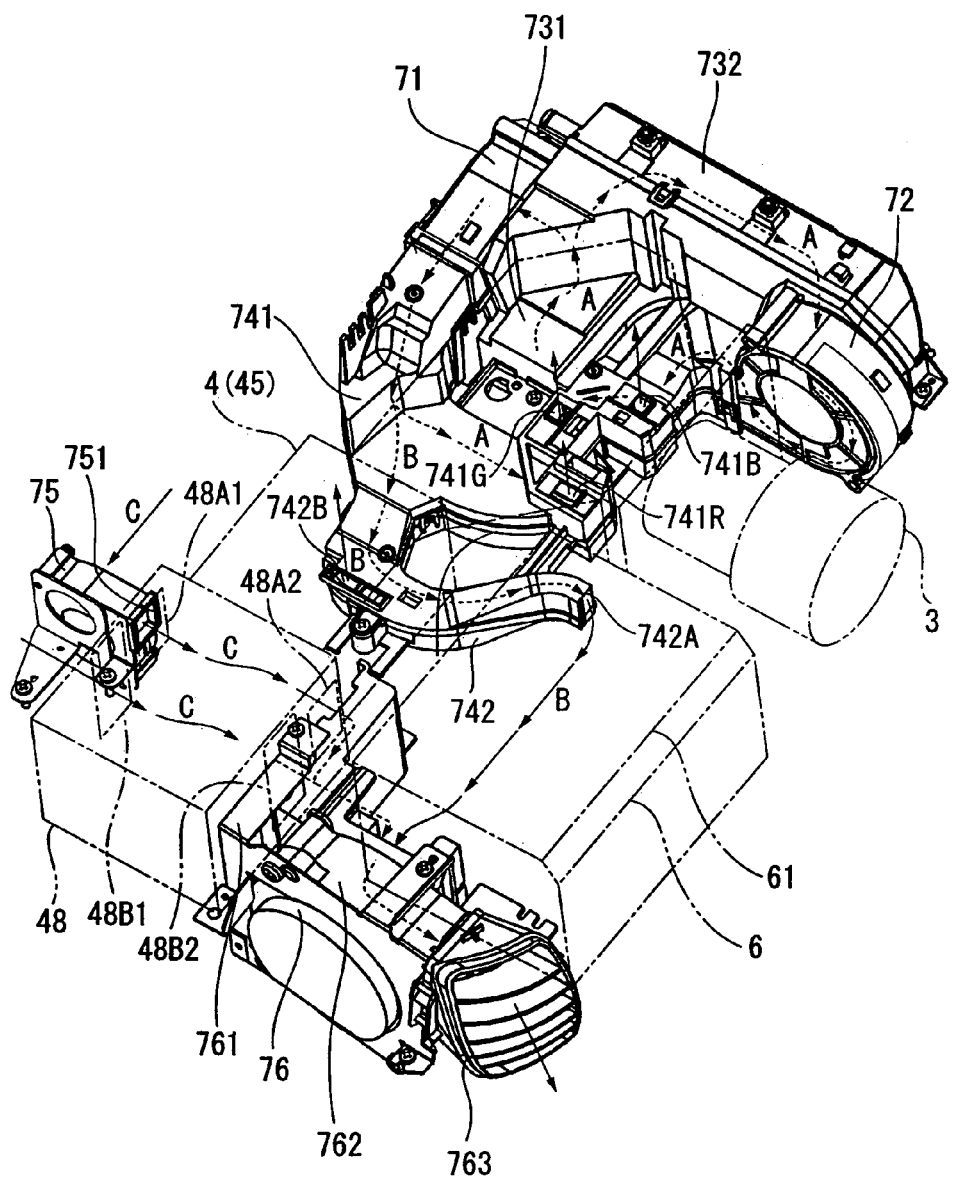
FIG. 15 is an illustration showing the cooling channel formed inside the projector of the aforesaid embodiment.

FIG. 15 is an illustration showing the cooling channel formed inside the projector 1.

As shown in FIG. 15, a panel cooling channel A that mainly cools the liquid crystal panels 441R, 441G and 441B, a polarization converter/power supply cooling channel B that mainly cools the polarization converter 414 and the power supply unit 6, and a light source cooling channel C that mainly cools the light source device 411 are constructed inside the projector 1 by the above-described cooling unit 7.

The panel cooling channel A is formed by circulating the cooling air inside the projector 1 as follows.

To be more specific, as shown in FIG. 15, driving of the sirocco fans 71 and 72 causes the cooling air outside the projector 1 to be introduced to the inside of the first suction-side duct 731 from the suction hole 2A (FIG. 2) formed on the bottom side 22A of the lower case 22, and then sucked by the both sirocco fans 71 and 72 via the second suction-side duct 732.

The cooling air sucked by the sirocco fan 71 is discharged from the discharge hole and introduced to the inside of the first discharge-side duct 741 from an end of the first discharge-side duct 741. A part of the cooling air introduced to the inside of the first discharge-side duct 741 is rectified by a rectifying plate (not shown) provided inside and flowed to the outside of the first discharge-side duct 741 via the outflow hole 741R.

On the other hand, the cooling air sucked by the sirocco fan 72 is discharged from the discharge hole, introduced to the inside of the first discharge-side duct from the other end of the first discharge side duct 741, and flowed to the outside of the first discharge-side duct 741 via the outflow holes 741B and 741G.

The cooling air flowed to the outside of the first discharge-side duct 741 via the outflow holes 741R, 741G and 741B is introduced to the inside of the light guide 45 from the opening (not shown) formed on the bottom portion of the light guide 45. The cooling air introduced to the inside of the light guide 45 flows from the lower side of the optical device 44 toward the upper side thereof while cooling the liquid crystal panels 441R, 441G and 441B, incident-side polarization plate 442 and the irradiation-side polarization plate 444, and then flowed to the outside of the light guide 45. Then, the air flowed to the outside of the light guide 45 is attracted by the sirocco fan 762 of the exhaust unit 76, flowed along the control board 5 while cooling the control board 5 (FIG. 4) and then exhausted from the exhaust hole 2B (FIG. 1) of the exterior case 2 via the louver 763.

The polarization converter/power supply cooling channel B is formed by circulating the cooling air inside the projector 1 as follows.

To be more specific, a part of the cooling air discharged from the sirocco fan 71 and introduced to the inside of the first discharge-side duct 741 from an end of the first discharge-side duct 741 is rectified by a rectifying plate (not shown) provided inside and introduced to the inside of the second discharge-side duct 742 from an end of the second discharge-side duct 742.

A part of the cooling air introduced to the inside of the second discharge-side duct 742 is flowed to the outside of the second discharge-side duct 742 via the outflow hole 742B.

The cooling air flowed to the outside of the second discharge-side duct 742 via the outflow hole 742B is introduced to the inside of the light guide 45 from the opening (not shown) formed on the bottom portion of the light guide 45 for cooling the polarization converter 414, and then flowed to the outside of the light guide 45 from the opening 47A (FIG. 7) formed on the upper light guide 47. Then, the air flowed to the outside of the light guide 45 is flowed along the control board 5 while cooling the control board 5 (FIG. 4) in the same manner as the above-described panel cooling channel A and then exhausted from the exhaust hole 2B (FIG. 1) of the exterior case 2 via the louver 763.

On the other hand, a part of the cooling air introduced to the inside of the second discharge-side duct 742 is guided by the second discharge-side duct 742, and then flowed to the outside of the second discharge-side duct 742 from the outflow hole 742A formed on the other end thereof.

The cooling air flowed to the outside of the second discharge-side duct 742 via the outflow hole 742A is attracted by the sirocco fan 762 of the exhaust unit 76, and then introduced to the inside of the power supply unit 6 from the openings of the respective tube components of the power supply block 61 and the lamp drive block constituting the power supply unit 6. The cooling air introduced to the inside of the power supply unit 6 is flowed along the respective tube components while cooling circuit elements mounted on the respective circuit boards of the power supply block 61 and the lamp drive block, and then exhausted from the exhaust hole 2B (FIG. 1) of the exterior case 2 via the louver 763.

The light source cooling channel C is formed by circulating the cooling air inside the projector 1 as follows.

To be more specific, the air inside the projector 1 sucked by the sirocco fan 75 is discharged from the discharge hole 751, and then flowed to the inside of the light source housing 48 from the inflow opening 48A1 formed on the lateral side of the light source housing 48 of the light guide 45. The air flowed to the inside of the light source housing 48 is flowed to the inside of the light source device 411 (FIG. 6) to cool the light source lamp 411A (FIG. 6). The heated air after cooling the light source lamp 411A (FIG. 6) is flowed to the outside of the light source device 411 (FIG. 6), and then flowed to the outside of the light source housing 48 via the outflow opening 48A2 formed on the lateral side of the light source housing 48.

Driving of the sirocco fan 762 of the exhaust unit 76 causes the air stayed beside the light source housing 48 to be attracted, and then flowed to the inside of the light source housing 48 from the inflow opening 48B1 formed on the lateral side of the light source housing 48. The air flowed to the inside of the light source housing 48 is circulated along the rear side of the reflector 411B (FIG. 6) of the light source device 411 (FIG. 6) for cooling the reflector 411B (FIG. 6). The heated air after cooling the reflector 411B (FIG. 6) is flowed to the outside of the light source housing 48 via the outflow opening 48B2 formed on the lateral side of the light source housing 48.

Then, the heated air that has cooled the light source lamp 411A and the reflector 411B and has been flowed to the outside of the light source housing 48, is sucked by the sirocco fan 762 via the exhaust-side duct 761 of the exhaust unit 76 and then exhausted from the exhaust hole 2B (FIG. 1) of the exterior case 2 via the louver 763.

(5) Advantages of Embodiment

According to the above-described embodiment, following advantages can be obtained.

(5-1) The sirocco fan 762 of the exhaust unit 76 is disposed such that its suction side is along a plane orthogonal to the optical path plane defined by the light source device 411, the liquid crystal panel 441 and the projection lens 3, and the discharge hole 762A is inclined in a fan rotation direction, i.e., downward, for discharging the sucked air toward the substantial center of the end surface with the exhaust hole 2B formed in the thickness direction. With this arrangement, an exhaust efficiency and quietness of the projector 1 can be enhanced by effectively sucking the air inside the projector 1 without the rotation number of the sirocco fan 762 increased more than necessary, and besides, the thickness of the projector is not required to be increased even when the exhaust hole 2B is formed on the end surface of the exterior case 2 at a position corresponding to the discharge hole 762A.

(5-2) Since the exhaust hole 2B is formed on the front side of the projector 1, the heated air exhausted from the projector 1 is exhausted from the projection side thereof. In other words, the heated air can be inhibited from blowing to a person who is located on the rear side or the lateral side of the projector 1.

(5-3) Since the sirocco fan 762 is arranged such that its suction side is inclined relative to the projection direction of the light beam of the projection lens 3 and the sucked air is discharged in a direction away from the projection direction, the exhausting direction can be set aside the projection image projected by the projector 1, thus preventing flickers or the like of the projection image due to the heated air.

(5-4) Since the louver 763 has the fixture 763D at one of the lateral end surfaces thereof and the louver 763 is supported in a cantilevered manner by the louver fixture 764B3 of the fan fixture 764, the louver 763 can move relative to the fan fixture 764 even when the louver 763 is attached to the bottom side 22A of the lower case 22 with the exhaust unit 76 integrated as a unit, so that the louver 763 can appropriately be engaged with the cutout 22C1 formed on the lower case 22 and effectively be placed relative to the exterior case 2 of the exhaust unit 76.

(5-5) Since the louver 763 of the exhaust unit 76 is formed substantially in a cylindrical shape, and the opening 763C at the rear side thereof is inserted and fitted to the discharge hole 762A of the sirocco fan 762 with a buffer material being interposed, a clearance will not be formed between the louver 763 and the discharge hole 762A of the sirocco fan 762, so that all of the air discharged from the sirocco fan 762 can be exhausted to the outside via the louver 763. Therefore, deterioration in a cooling efficiency at the inside of the projector 1 on account of the exhausted air returning to the inside of the projector 1 can be avoided.

(5-6) Since the fan fixture 764 is a metal member located at one of the end surfaces of the sirocco fan 762, the fan fixture 764 can shield the electromagnetic wave radiated from the sirocco fan 762 as the sirocco fan 762 drives, thereby avoiding electromagnetic interference against external equipments.

(5-7) Since the projector 1 includes the upper shield plate 8A and the lower shield plate 8C respectively at the upper side and the lower side of the device body, the shield plates 8A and 8C can avoid the interference to the external equipments on account of the electromagnetic wave radiated from the respective components of the projector 1.

(5-8) Since the fan fixture 764 is connected with the lower shield plate 8C set to the ground potential in an electrically conductive manner, the electric potential of the fan fixture 764, the lower shield plate 8C and the upper shield plate 8A can be identical with each other, thereby restricting the mutual interference due to variation in the electric potential among the sirocco fan 762 and other components.

(5-9) Since the side case 24 is provided with the fixing hole 241 while the fan fixture 764 is provided with the lamp cover fixture 764B4, the side case 24 can be fixed to the exterior case 2 by inserting a screw or the like to the fixing hole 241 and screwing the screw to the lamp cover fixture 764B4, and consequently the appearance of the projector 1 can appropriately be maintained because of such fixing structure. Additionally, since the side case 24 is fixed to the exterior case 2, it is not required to provide a fixing member additionally at the inside of the exterior case 2, so that the space inside the projector 1 can be saved and production cost of the projector 1 can be lowered in view of reduction in the number of components.

(5-10) The exhaust unit 76 is housed and arranged at the dent defined by the bulged portion 22A2 formed on the bottom side 22A of the lower case 22 and the bulged portion 22C1 formed on the lateral side 22C of the lower case 22. With this arrangement, for example, a larger sirocco fan 762 may be applied as an exhaust fan of the exhaust unit 76 in compared to a configuration without the above bulged portions 22A2 and 22C1 formed. Accordingly, an exhaust efficiency of the air inside the projector 1 and quietness of the projector 1 can further be enhanced.

(5-11) The sirocco fans 71 and 72 of the cooling unit 7 are arranged such that their suction sides are along a plane orthogonal to the optical path plane and spaced apart from the suction hole 2A of the exterior case 2 via the suction-side duct 73 in the same manner as the sirocco fan 762 of the exhaust unit 76. Accordingly, the noise leaking to the outside via the suction hole 2A from the sirocco fans 71 and 72 can be decreased, thus further enhancing the quietness of the projector 1.

(6) Modifications of Embodiment

Incidentally, the scope of the present invention is not restricted to the above embodiment but includes following modifications as long as an object of the present invention can be achieved.

In the above embodiment, while the exhaust hole 2B of the exterior case 2 is formed on the front side of the exterior case 2, it is not limited thereto, and the exhaust hole 2B may be formed on the rear side or at the lateral side of the exterior case 2.

In the above embodiment, though it is described that the sirocco fan 762 of the exhaust unit 76 has a configuration in which the discharge hole 762A is located at the upper side of the sirocco fan 762, it is not limited thereto. In other words, the sirocco fan 762 is just required to be disposed such that its suction side is along a plane orthogonal to the optical path plane defined by the light source device 411, the liquid crystal panel 441 and the projection lens 3, and the discharge hole 762A is inclined in a fan rotation direction, so that the air is discharged substantially toward the center of the end surface with the exhaust hole 2B formed in the thickness direction. For example, when the discharge hole 762A of the sirocco fan 762 is located at the lower side of the sirocco fan 762, the discharge hole 762A may be inclined upward, so that the air is discharged substantially toward the center of the end surface with the exhaust hole 2B formed in the thickness direction.

In the above embodiment, though the louver 763 of the exhaust unit 76 is provided with the fixture 763D at one of the end surfaces thereof while the fan fixture 764 is provided with the louver fixture 764B3 at the position corresponding to the fixture 763D, it is not limited thereto. That is, the fixture 763D and the louver fixture 764B3 may be formed at any positions as long as the louver 763 is supported in a cantilevered manner relative to the fan fixture 764.

Though a projector using three optical modulators are exemplified in the above embodiment, the present invention may be applied to a projector using a single optical modulator, two optical modulators or more than three optical modulators.

Though a liquid crystal panel is used as the optical modulator in the above embodiment, an optical modulator other than the liquid crystal panel such as a device using a micro-mirror may be used.

Though a transmissive optical modulator having different light-incident side and light-irradiation side is used in the above embodiment, a reflective optical modulator having common light-incident side and light-irradiation side may be used.

Although the best configuration for implementing the present invention has been disclosed above, the present invention is not limited to the best configuration. In other words, the present invention is mainly illustrated and described on the specific embodiment, however, a person skilled in the art can modify the specific configuration such as shape, material, quantity on the above-described embodiment as long as a technical idea and an object of the present invention can be achieved.

Therefore, the description that limits the shape and the material is only the example to make the present invention easily understood, but does not intend to limit the present invention, so that the present invention includes the description using a name of component without a part of or all of the limitation on the shape and the material etc.

INDUSTRIAL APPLICABILITY

The projector according to the present invention is useful as a projector applied to the field of presentation, home theater or the like, since the exhaust efficiency can be enhanced by effectively sucking the air inside thereof without the rotation number of the exhaust fan increased, as well as the thickness can be decreased.

The invention claimed is:

1. A projector, comprising:
a light source device;
an optical modulator that modulates a light beam irradiated by the light source device in accordance with image information;
a projection optical device that projects the modulated light beam in an enlarged manner; and
a substantially rectangular parallelepiped casing in which the light source device, the optical modulator, and the projection optical device are arranged,
wherein an exhaust hole that exhausts air inside the casing to the outside is formed on the casing on one of end surfaces substantially orthogonal to a projection direction of the light beam from the projection optical device,
wherein an exhaust fan that sucks the air inside the casing and discharges the air via the exhaust hole is provided on the casing, the exhaust fan being opposed to the exhaust hole, and
wherein the exhaust fan is a centrifugal fan that discharges the air sucked from a fan rotation axis direction to a rotation tangential direction, a suction side of the exhaust fan being disposed along a plane orthogonal to an optical path plane defined by the light source device, the optical modulator and the projection optical device, a discharge side thereof being inclined in a fan rotation direction, so that the sucked air is discharged substantially toward the center of the end surface with the exhaust hole formed in a direction orthogonal to the optical path plane.

2. The projector according to claim 1,
wherein the exhaust hole is formed on an end surface of the casing positioned in the projection direction, and
wherein the exhaust fan is disposed such that the suction side is inclined relative to the projection direction, so that the air inside the casing is discharged to the outside in a direction away from the projection direction through the exhaust hole.

3. The projector according to claim 1, further comprising:
a louver for rectifying the air discharged from the exhaust fan in a predetermined direction and a fan fixture that fixes the exhaust fan and the louver inside the casing in an integrated manner,
wherein the louver has a fixture that is fixed to the fan fixture, the louver being supported in a cantilevered manner relative to the fan fixture by the fixture.

4. The projector according to claim 2, further comprising:
a louver for rectifying the air discharged from the exhaust fan in a predetermined direction and a fan fixture that fixes the exhaust fan and the louver inside the casing in an integrated manner,
wherein the louver has a fixture that is fixed to the fan fixture, the louver being supported in a cantilevered manner relative to the fan fixture by the fixture.

5. The projector according to claim 3, wherein the louver surrounds a discharge hole of the exhaust fan, and includes a tube component inserted and fitted to the discharge hole.

6. The projector according to claim 3, further comprising:
a shield member disposed along an inner circumference of the casing,
wherein the fan fixture is a metal member arranged to cover the exhaust fan and is electrically connected to the shield member.

7. The projector according to claim 5, further comprising:
a shield member disposed along an inner circumference of the casing, wherein the fan fixture is a metal member arranged to cover the exhaust fan and is electrically connected to the shield member.

8. The projector according to claim 3, wherein the exhaust fan is attached around the light source device inside the casing with the fan fixture being interposed, wherein the casing has a lamp cover that detachably attaches the light source device to the casing, and wherein a lamp cover fixture for fixing the lamp cover to the casing is formed on the fan fixture.

9. The projector according to claim 5, wherein the exhaust fan is attached around the light source device inside the casing with the fan fixture being interposed, wherein the casing has a lamp cover that detachably attaches the light source device to the casing, and wherein a lamp cover fixture for fixing the lamp cover to the casing is formed on the fan fixture.

10. The projector according to claim 6, wherein the exhaust fan is attached around the light source device inside the casing with the fan fixture being interposed, wherein the casing has a lamp cover that detachably attaches the light source device to the casing, and wherein a lamp cover fixture for fixing the lamp cover to the casing is formed on the fan fixture.

* * * * *